United States Patent
Loudon et al.

(10) Patent No.: US 9,930,877 B2
(45) Date of Patent: *Apr. 3, 2018

(54) MICROFABRICATED SURFACES FOR THE PHYSICAL CAPTURE OF INSECTS

(71) Applicants: The Regents of the University of California, Oakland, CA (US); The University of Kentucky Research Foundation, Lexington, KY (US)

(72) Inventors: Catherine Loudon, Irvine, CA (US); Robert Corn, Corona del Mar, CA (US); Megan Szyndler, Irvine, CA (US); Kenneth F. Haynes, Lexington, KY (US); Michael F. Potter, Lexington, KY (US)

(73) Assignees: The Regents of the University of California, Oakland, CA (US); The University of Kentucky Research Foundation, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,859

(22) Filed: Sep. 19, 2016

(65) Prior Publication Data

US 2017/0055512 A1     Mar. 2, 2017

Related U.S. Application Data

(63) Continuation of application No. 14/381,890, filed as application No. PCT/US2013/027772 on Feb. 26, 2013, now Pat. No. 9,468,203.

(Continued)

(51) Int. Cl.
*A01M 3/02* (2006.01)
*A01M 1/10* (2006.01)
*A01M 99/00* (2006.01)

(52) U.S. Cl.
CPC .............. *A01M 1/103* (2013.01); *A01M 1/10* (2013.01); *A01M 99/00* (2013.01)

(58) Field of Classification Search
CPC ................................. A01M 1/103; A01M 1/04
(Continued)

(56) References Cited

U.S. PATENT DOCUMENTS 2,891,347 A * 6/1959 Swint ...................... A01M 3/02
43/137
3,837,988 A * 9/1974 Hennen ................... B32B 27/00
156/167

(Continued)

FOREIGN PATENT DOCUMENTS

WO       2013130452 A1     9/2013

OTHER PUBLICATIONS

International Preliminary Report on Patentability for International Application PCT/US2013/027772, report completed Apr. 10, 2013, dated Sep. 12, 2014, 10 Pgs.

(Continued)

*Primary Examiner* — Shin H Kim
(74) *Attorney, Agent, or Firm* — KPPB LLP

(57) ABSTRACT

Novel devices and methods of capturing, controlling and preventing infestation of insects using microfabricated surfaces are provided. In particular, a mechanism of insect capture inspired by the microstructures of the leaf surfaces of plants and the key features of those surfaces with respect to the capture and control of pests have been determined and engineered into a variety of microfabricated surfaces capable of reproducing the effectiveness of these physical capture methods.

20 Claims, 13 Drawing Sheets

Related U.S. Application Data

(60) Provisional application No. 61/604,808, filed on Feb. 29, 2012.

(58) Field of Classification Search
USPC .................................................. 43/107–123
See application file for complete search history.

(56) References Cited

U.S. PATENT DOCUMENTS

| | | | | |
|---|---|---|---|---|
| 3,931,692 | A * | 1/1976 | Hermanson | A01M 1/2055 424/84 |
| 4,103,450 | A * | 8/1978 | Whitcomb | A01M 1/2016 428/907 |
| 4,593,489 | A * | 6/1986 | Gott | A01M 3/02 43/137 |
| 4,852,517 | A * | 8/1989 | Smith | A01K 1/0353 119/28.5 |
| 5,007,195 | A * | 4/1991 | Patterson | A01K 85/02 43/42.4 |
| 5,119,586 | A | 6/1992 | Townsend et al. | |
| 5,150,541 | A * | 9/1992 | Foster | A01M 1/02 43/131 |
| 5,238,682 | A * | 8/1993 | Akasaka | D01F 6/18 424/405 |
| 5,522,174 | A * | 6/1996 | Wagner | A01M 3/02 15/187 |
| 5,676,850 | A | 10/1997 | Reed et al. | |
| 7,811,272 | B2 * | 10/2010 | Lindsay | A61F 13/5611 428/100 |
| 9,468,203 | B2 * | 10/2016 | Loudon | A01M 1/103 |
| 2003/0166372 | A1 * | 9/2003 | Thomas | D04H 1/46 442/401 |
| 2005/0048859 | A1 * | 3/2005 | Canham | A61B 17/06166 442/189 |
| 2005/0148984 | A1 * | 7/2005 | Lindsay | A61F 13/5611 604/387 |
| 2006/0202385 | A1 | 9/2006 | Xu et al. | |
| 2007/0134465 | A1 | 6/2007 | Vanbenschoten et al. | |
| 2010/0259155 | A1 | 10/2010 | Hiroike et al. | |
| 2014/0215897 | A1 * | 8/2014 | McAllister | A01M 29/34 43/107 |
| 2015/0013213 | A1 * | 1/2015 | Loudon | A01M 1/103 43/118 |
| 2015/0113852 | A1 * | 4/2015 | Kudner | A01K 77/00 43/11 |
| 2017/0055512 | A1 * | 3/2017 | Loudon | A01M 1/103 |

OTHER PUBLICATIONS

International Search Report and Written Opinion for International Application PCT/US2013/027772, completed Apr. 10, 2013, 11 pgs.
Bauer, G et al., "Always on the bright side: the climbing mechanism of *Galium aparine*", Proceedings of the Royal Society B: Biological Sciences, Nov. 16, 2010, vol. 278, pp. 2233-2239.
Burst, N. et al., "Investigating the Thin-Film Versus Bulk Material Properties of Structural Adhesives", The Journal of Adhesion, Jan. 20, 2011, vol. 82, pp. 72-92.
Choi et al., "Simple Fabrication of Symmetric High-Aspect-Ratio Polymer Nanopillars by Resuable AAO Templates", Langmuir Letter, Jan. 19, 2011, vol. 27, pp. 2132-2137.
Dahlin, R. M. et al., "Characterization and Density of Trichomes on Three Common Bean Cultivars", Econ. Bot., Jul. 1992, vol. 46, pp. 299-304.
Eisner et al., "When defense backfires: Detrimental effect of a plants protective trichomes on an insect beneficial to the plant", Proc. Natl. Acad. Sci. USA, Apr. 1998, vol. 45, pp. 4410-4414.
Gibson, "The hierarchical structure and mechanics of plant materials", Journal of the Royal Society Interface, Aug. 12, 2012, vol. 9, pp. 2749-2766.
Gilbert, "Butterfly-Plant Coevolution: Has Passiflora Adenopoda Won the Selectional Race with Heliconiine Butterflies?", Science, May 7, 1971, vol. 172, pp. 585-586.

Gorb, E. V. et al., "In Design and Nature: Comparing Design in Nature with Science and Engineering", WIT Press, Southampton, UK, 2002, pp. 151-160.
Harlan, J. H. et al., "Bed bug control: challenging and still evolving", Pest Management, 2007, vol. 18, pp. 57-61 (abstract only).
Henry et al., "Microfabricated Microneedles: A Novel Approach to Transdermal Drug Delivery", Journal of Pharmaceutical Sciences, Aug. 8, 1998, vol. 87, No. 8, pp. 922-925.
Hiller, S. et al., "A Micro-Penetration Technique for Mechanical Testing of Plant Cell Walls", J. Texture Stud., 1996, vol. 27, pp. 559-587.
Jeffree, C. E. "Insects and the Plant Surface", B, Juniper, R. Southwood, Eds., London: Edward Arnold Ltd., 1983, pp. 23-64.
Johnson, B., "The injurious effects of the Hooked Epidermal Hairs of French Beans (*Phaseolus vulgaris* L.) on Aphis craccivora Koch", B. Entomol. Res., 1953, vol. 44, pp. 779-788 (abstract only).
Katnam, K. B. et al., "Investigating tensile behaviour of toughened epoxy paste adhesives using circumferentially notched cylindrical bulk specimens", International Journal of Adhesion and Adhesives, 2012, vol. 37, pp. 3-10.
Kim et al., "Shape-Tunable Polymer Nanofibrillar Structures by Oblique Electron Beam Irradiation", Langmuir Letter, Jun. 18, 2009, vol. 25, No. 16, pp. 8879-8882.
Koch et al., "A fast, precise and low-cost replication technique for nano-and high-aspect-ratio structures of biological and artificial surfaces", Bioinspiration &.Biomimetics, Sep. 8, 2008, vol. 3, pp. 1-10.
Koch et al., "Multifunctional surface structures of plants: An inspiration for biometrics", Progress in Materials Science, 2009, vol. 54, pp. 137-178.
Lee, "Regina 0. Bed Bug Traps—The Proactive Approach", Articles base, Oct. 21, 2011, Retrieved from URL: http:www.articlesbase.com/health-articles/bed-bug-traps-the-proactive-approach-5327729.html on Apr. 8, 2013.
Lilleheden, L. "Mechanical properties of adhesives in situ and in bulk", International Journal of Adhesion and Adhesives, Jan. 1994, vol. 14, pp. 31-37.
Mamidala, P. et al., "RNA-Seq and molecular docking reveal multi-level pesticide resistance in the bed bug", BMC Genomics, Jan. 6, 2012, vol. 13, 16 pgs.
Park et al., "Biodegradable polymer microneedles: Fabrication, mechanics and transdermal drug delivery", Journal of Controlled Release, Apr. 1, 2005, vol. 104, pp. 51-66.
Perry, "Insects and the Plant Surface", B. Juniper, R. Southwood, Eds., London: Edward Arnold Ltd., 1986, pp. 345-346.
Pillemer et al., "Hooked Trichomes: A Physical Plant Barrier to a Major Agricultural Pect", Science, Jun. 2, 1976, vol. 193, pp. 482-484.
Potter, M. F. et al., "Bugs Without Borders—Executive Summary", Pest World, Sep./Oct. 8-20, 2010, 5 pgs.
Potter, M. F. "The History of Bed Bug Management—With Lessons from the Past", American Entomologist, Jan. 1, 2011, vol. 57, No. 1, pp. 14-25.
Richardson, "The Action of Bean Leaves Against the Bedbug", Journal of Economic Entomology, 1943, vol. 36, pp. 543-545.
Riddick, E. W. et al., "Lima bean-lady beetle interactions: hooked trichomes affect survival of *Stethorus punctillum* larvae", Biocontrol, Aug. 29, 2010, vol. 56, pp. 55-63.
Romero, A. et al., "Insecticide Resistance in the Bed Bug: A Factor in the Pest's Sudden Resurgence?", Journal of Medical Entomology, Mar. 1, 2007, vol. 44, No. 2, pp. 175-178.
Saenz, V L. et al., "Genetic analysis of Bed Bug Populations Reveals Small Propagule Size Within Individual Infestations but High Genetic Diversity Across Infestations From the Eastern United States", Journal of Medical Entomology, Jul. 1, 2012, vol. 49, No. 4, pp. 865-875.
Schulte et al., "Biomimetic replicas: Transfer of complex architectures with different optical properties from plant surfaces onto technical materials", Acta Biomaterialia, Jan. 31, 2009, vol. 5, pp. 1848-1854.

(56) References Cited

OTHER PUBLICATIONS

Stenglein, S. A. et al., "Micromorpholigical variability of leaf epidermis in Mesoamerican common bean (*Phaseolus vulgaris*, Leguminosae)", Australian Journal of Botany 2004, vol. 52, pp. 73-80.

Vincent, "From Cellulose to Cell", Journal of Experimental Biology, Nov. 16, 1999, vol. 202, pp. 3263-3268.

Wetzel et al., "Epoxy nanocomposites with high mechanical and tribological performance", Composites Science and Technology, Mar. 7, 2003, vol. 63, pp. 2055-2067.

Yoon, K. S. et al., "Biochemical and Molecular Analysis of Deltamethrin Resistance in the Common Bed Bug (Hemiptera: Cimicidae)", Journal of Medical Entomology, Nov. 1, 2008, vol. 45, pp. 1092-1101.

Zheng, S. et al., "A depth sensing indentation study of the hardness and modulus of adhesives", International Journal of Adhesion and Adhesives, Feb. 2005, vol. 25, pp. 67-76.

Zhu, F et al., "Widespread distribution of knockdown resistance mutations in the bed bug, Cimex lectularius (Hemiptera: Cimicidae), Populations in the United States", Archives of Insect Biochemistry and Physiology, Mar. 18, 2010, vol. 73, pp. 245-257.

\* cited by examiner

MICROFABRICATED SURFACES FOR THE PHYSICAL CAPTURE OF INSECTS

CROSS-REFERENCE TO RELATED APPLICATIONS

This application is a continuation of application Ser. No. 14/381,890, filed Aug. 28, 2014, which application is a national stage application of Application No. PCT/US2013/027772, filed Feb. 26, 2013, which application claims priority to Application No. 61/604,808, filed Feb. 29, 2012, the disclosures of which are incorporated herein by reference in their entirety.

STATEMENT OF FEDERAL FUNDING

The invention described herein was made in the performance of work under NSF Grant No. CHE-1057638, and the federal government may have rights in it subject thereto.

FIELD OF THE INVENTION

The current invention is generally directed to methods of capturing, controlling and preventing infestation by insects; and more particularly to microfabricated surfaces for such use.

BACKGROUND OF THE INVENTION

Bed bugs (*Cimex lectularius* L.) are an ancient scourge that have made a dramatic comeback in recent years across the globe, infesting structures such as homes, hotels, schools, movie theaters, and hospitals. (See, e.g., Saenz V L, et al., J. Med. Entomol. 49, 865-875; Harlan J H., Outl. Pest Manag. 18, 57-61 (2007); and Potter M F, et al., Pest World September/October, 8-20 (2010), the disclosure of which is incorporated herein by reference.) There was a decline of bed bug infestations in the 1940's and 1950's following the application of DDT and other potent pesticides legal at the time. The recent resurgence of bed bug infestations occurring both domestically and internationally has led to a renewed interest in the development of new, more environmentally friendly and sustainable methods to capture, control, and prevent bed bugs.

To date, the primary strategy for bed bug abatement has been to develop and apply chemical pesticides. However, bed bugs have grown resistant to many of the commonly used pesticides making this approach increasingly ineffective. In addition, reliance upon pesticides is increasingly perceived as imprudent because of the large amount of potentially harmful chemicals that must be applied indoors in bedrooms and other sensitive locations. Non-chemical abatement methods such as heat, cold, vacuuming, and bed encasement, are being utilized as well but tend to be laborious, costly, and frequently ineffective. Such methods also tend to be curative rather than preventative in nature.

For many years, bean leaves have been known to capture bed bugs. Historical reports describe the capture of bed bugs in Balkan countries by leaves from bean plants strewn on the floor next to beds. (See, e.g., Potter M F, *Amer. Entomol.* 57, 14-25 (2011), the disclosure of which is incorporated herein by reference.) During the night, bed bugs walking on the floor would accumulate on these bean leaves, which were collected and burned the following morning to exterminate the bed bugs. The capture of bed bugs by the bean leaves was attributed to the action of microscopic plant hairs (trichomes) on the leaf surfaces that would entangle the legs of the bed bugs. (See, for example, Richardson, H. H., J. Econ. Entomol. 36, 543 (1943), the disclosure of which is incorporated herein by reference.) The disadvantages of this approach include: the supply of a sufficient number of fresh bean leaves, the inconvenience of having leaves spread on the floor, the inconsistencies inherent in such naturally occurring materials, and the rapid wilting/desiccation of the leaves that stop them from functioning in bed bug capture for longer than overnight. In addition, because the bean leaves are limited as to how and where they may be applied, bed bugs are able to avoid capture by crawling along surfaces that cannot easily be covered by the leaves.

Despite its limitations, this physical capture mechanism is a source of inspiration in the development of new and sustainable non-chemical methods to control the burgeoning numbers of bed bugs. A purely physical management method has the additional advantage that it would avoid the problem of pesticide resistance that has been documented extensively for this insect. (Romero A, et al., J. Med. Entomol. 44, 175-178 (2007); Yoon K S, et al., J. Med. Entomol. 45, 1092-1101 (2008); Zhu F, et al., Arch. Insect Biochem. 73, 245-257 (2010); and Mamidala P, et al., BMC Genomics 13 (2012), the disclosure of which is incorporated herein by reference.) Accordingly, a need exists to create improved techniques and devices to capture, control and prevent infestation by bed bugs and other insects.

SUMMARY OF THE INVENTION

In some embodiments, the invention is directed to a microfabricated insect capturing surface including:
  a substrate defining a plane;
  a plurality of insect capture surface microstructures each formed from a flexible elongated member, the plurality of surface microstructures being disposed on the substrate with a variable orientation to the plane of the substrate and at a density sufficient such that multiple insect capture surface microstructures are capable of simultaneously interacting with an insect disposed thereon;
  wherein at least some of the surface microstructures have a recurved body capable of entangling the insect, and wherein at least some of the surface microstructures include a piercing element being sufficiently rigid and sharp to pierce the insect body; and
  wherein the surface microstructures are formed from a material having a breaking stress sufficiently large to avoid breakage during interaction with the insect.

In some such embodiments, each of the plurality of insect capture surface microstructures has a recurved body, and wherein at least one piercing tip is incorporated onto each of said insect capture surface microstructures.

In other such embodiments, the piercing tip is disposed at the terminating end of the elongated member. In these embodiments, the surface microstructures may include at least two piercing tips, and wherein the piercing tips are disposed along the body of elongated member.

In still other embodiments, the recurved body is formed in a shape selected from the group consisting of a hook, curve, loop or hoop.

In yet other embodiments, the piercing tip is selected from the group consisting of a sharp point, hook or barb.

In still yet other embodiments, the plurality of surface microstructures are dimensioned such that engage the underside of the insect body.

In still yet other embodiments, the piercing tip has a diameter of about 100 to 1000 nm.

In still yet other embodiments, the elongated member has a Young's Modulus of from 1 to 23 GPa.

In still yet other embodiments, the surface microstructures are modeled on a plant trichome. In these embodiments, the plant trichome may be modeled on one plant selected from the group *Phaseolus coccineus, Phaseolus vulgaris, Phaseolus limensis, Passiflora morifolia, Cynnoglossum officinale* and *Caiophora coronaria*.

In still yet other embodiments, the surface microstructures are disposed on the substrate in a density of between 20 to 300 surface microstructures per millimeter.

In still yet other embodiments, the surface microstructures are formed from a material selected from the group consisting of polymeric materials, natural fibers, metals, oxides and nano- or micro-engineered structures.

In still yet other embodiments, the elongated member is formed of a hollow body.

In other embodiments the invention is directed to a method of manufacturing a microfabricated insect capturing surface comprising:
  providing a substrate;
  disposing a plurality of insect capture surface microstructures thereon, each formed from a flexible elongated member, the plurality of surface microstructures being disposed on the substrate with a variable orientation to the plane of the substrate and at a density sufficient such that multiple insect capture surface microstructures are capable of simultaneously interacting with an insect disposed thereon;
  wherein at least some of the surface microstructures have a recurved body capable of entangling the insect, and wherein at least some of the surface microstructures include a piercing element being sufficiently rigid and sharp to pierce the insect body; and
  wherein the surface microstructures are formed from a material having a breaking stress sufficiently large to avoid breakage during interaction with the insect.

In some embodiments, the process of depositing is conducted by one of either a double molding or etching process.

In other embodiments, the method further comprises coating on or incorporating within the surface microstructures an additive material selected from the group consisting of oxide particles and a metallic material. In these embodiments, the additive material may be deposited by a technique selected from one of either physical vapor deposition or electro deposition.

In still other embodiments, the process of depositing is conducted by a microneedle technology.

In yet other embodiments, the recurve is formed into the surface microstructures by one of either an oblique e-beam irradiation or metal deposition.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION OF THE INVENTION

This description embodies constructs and methods of capturing, controlling and preventing infestation of insects using microfabricated surfaces. In particular, the mechanisms of bed bug capture by the microstructures of the leaf surfaces of four species of plants: *Phaseolus vulgaris* (three varieties used: kidney bean, pole bean, and green bean), *Phaseolus coccineus* (scarlet runner bean), *Phaseolus limensis* (lima bean) and *Passiflora morifolia* (passion flower), have been examined and the key features of those surfaces with respect to the capture and control of pests determined and engineered into a variety of microfabricated surfaces capable of reproducing the effectiveness of these physical capture methods.

Figure 1:
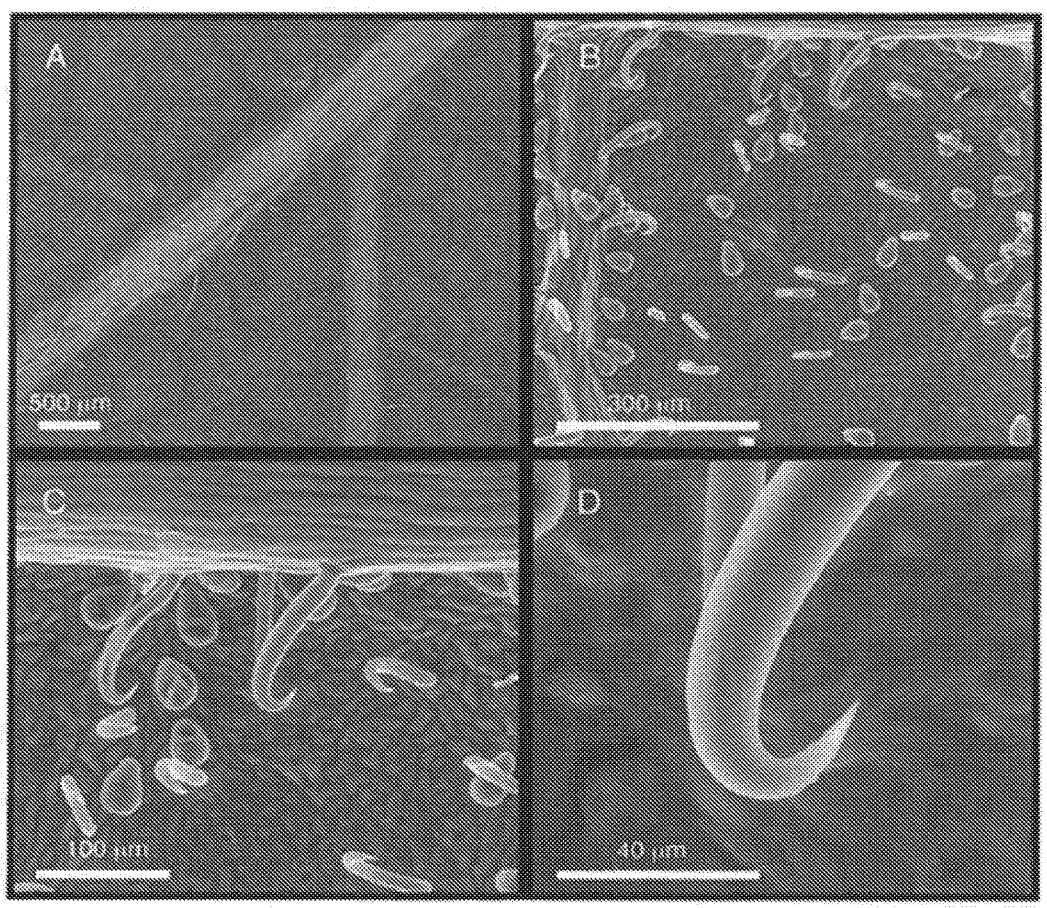
FIGS. 1A to 1D provide: images of a scarlet runner bean leaf in visible light (A), and viewed in SEM (B, C, D) showing the sharp points on the hooked trichomes, and their variable spacing and orientation on the surface of the leaf.

Although hooked trichomes have been documented in insect capture at times in the literature: the capture of nymphal and adult leafhoppers by *Phaseolus vulgaris* (Pillemer, E.; Tingey, W., Science 1976, 193, 482-484, the disclosure of which is incorporated herein by reference), a variety of insects in the Arizona desert by *Mentzelia pumila* (Eisner, T.; Eisner, M.; Hoebeke, E. R., Proceedings of the National Academy of Sciences 1998, 95 (8), 4410-4414, the disclosure of which is incorporated herein by reference), and the capture of caterpillars by *Passiflora adenopoda* (Gilbert, L. E., Science 1971, 172, 585-586, the disclosure of which is incorporated herein by reference), to date the only report of hooked trichomes on a plant capable of capturing bed bugs is the bean plant, *Phaseolus vulgaris*. (Richardson, cited above.) Effective capture of bed bugs by hooked trichomes on other surfaces have now been examined, and those features that tend to lead to capture of such insects determined. In particular, it has been discovered that the specific material properties and shape of microstructures, the density (spacing) of trichomes on the surfaces of specific types of plants, and their orientation is extremely variable (as shown in FIG. 1), and appears to be directly related to efficiency of bed bug capture across plant species. In addition, specific densities of trichomes have also been shown to affect the capture of other insects, such as, for example, leafhoppers.

All of the plant species studied appear in the first instance to have a similar surface texture that contains flexible microscopic microstructures or hairs having pointed or barbed ends, that are often hooked, i.e., a trichome structure. In order to understand the capture effectiveness of these natural surfaces, the features that make such surfaces effective have been evaluated. (These studies are described in greater detail in the Exemplary Embodiment section below.) For example, optical and SEM images of leaf undersurfaces are shown in FIG. 1. In addition, bed bugs were placed individually onto leaves and their movements recorded as digital movies. As a bed bug walks on one of these leaves, entanglement of a leg by a trichome causes a visible change in its walking behavior. Based on these observations, two discreet categories of entanglement have been identified:
- a momentary snag of a leg with the insect still able to break away (usually within a second); and
- a more involved and irreversible snare in which a visibly struggling insect is unable to pull away.

The production of effective insect capture surfaces depends on determining and maximizing the production of surface microstructures that lead to the second, irreversible type of entanglements.

Embodiments of Insect Capture Surfaces

Figure 2A:
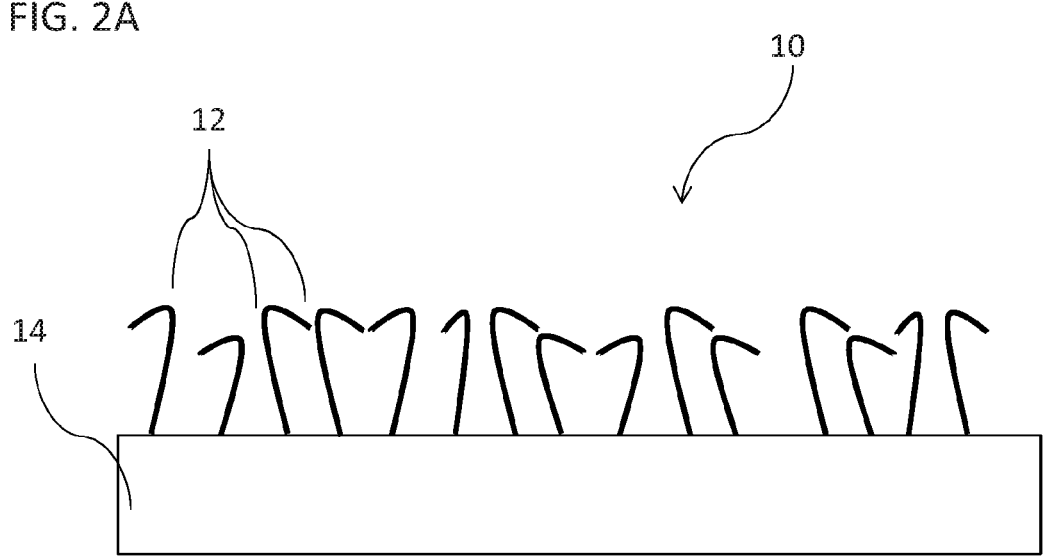
FIGS. 2A to 2E provide: (A) a schematic of embodiments of an insect capture surface, (B) a schematic of embodiments of an insect capture microstructure, (C) schematics of alternative embodiments of insect capture microstructures, (D) a top view of an insect capture surface and the density of microstructures on a surface, and (E) a schematic of an embodiment of an insect capture surface showing the variable orientations of disposed surface microstructures.

Based on detailed observations of several varieties of natural leaf surfaces and their specific ability to capture insects, it is now possible to create effective insect capturing surfaces that maximize irreversible snaring interactions with the insects of choice. Because it has now been discovered that a simply hooking action is insufficient to permanently snare the insects, embodiments include surface microstructures that are designed to both entangle and pierce. As shown in FIG. 2A, these surfaces (10) generally include a plurality of entangling and piercing microfabricated insect capture microstructures (12) formed on a supporting substrate (14). To optimize the probability of a piercing interaction between the insect capture microstructure and the vulnerable portion of the insect, three separate factors need to engineered: the density of the capture microstructures, the orientation of the microstructures relative to the plane of the substrate, and the structure of each of the individual capture microstructures. Embodiments of each of these elements are described above.

Figure 2B:
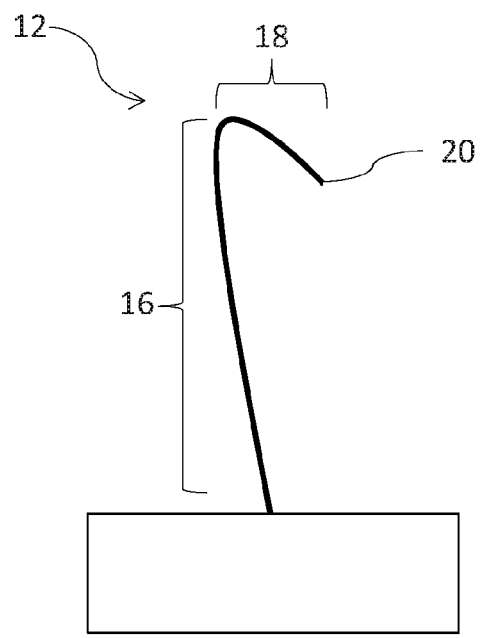
Figure 2C:
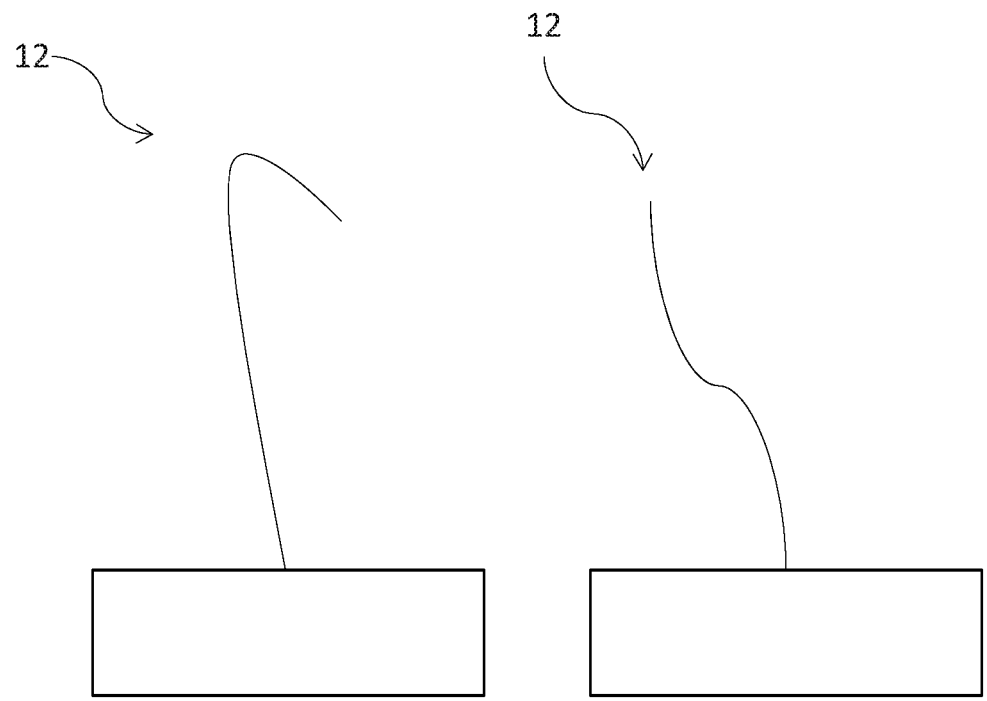
Figure 2C:
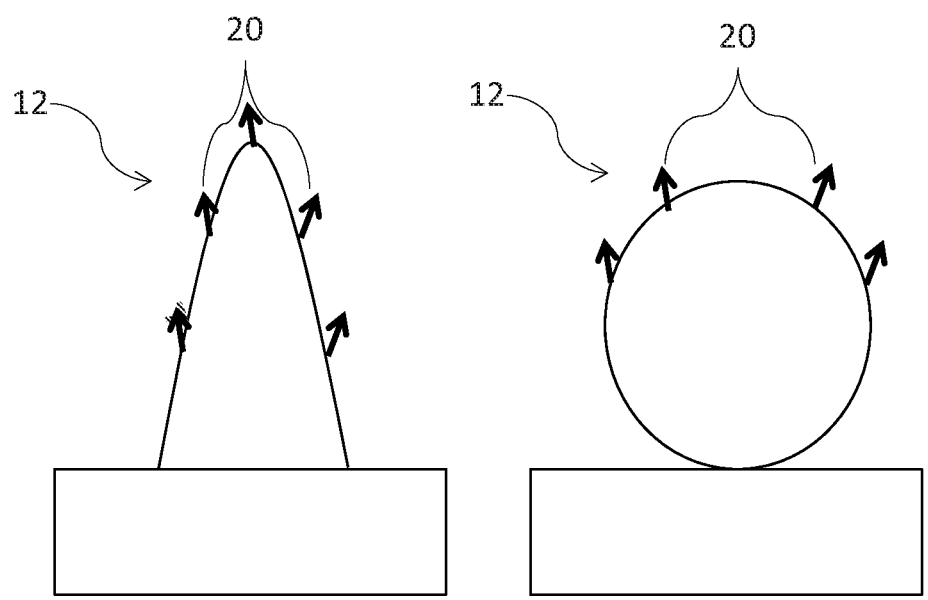

Turning first to the structure of the individual microstructures, the observations of the interactions of insects with different plant structures have shown several important functional aspects of a successful piercing capture microstructure. Embodiments of exemplary structures are shown in FIGS. 2B and 2C. As shown, the microstructures generally comprise a flexible elongated member (16) that provides at least an entangling function. The surface must also include a piercing microstructure disposed thereon (18). These microstructures may be independent or, as shown in FIGS. 2A to 2C, they may be combined into a single structure. However, regardless of how the capture microstructures are individually engineered, the capture surface should have the following functional characteristics: resiliency or flexibility, the ability to entangle, and the ability to pierce an insect.

First, to ensure that the elongated member is capable of moving across the body of the insect to entangle and interact with a vulnerable portion of the insect, and to make it more likely that the insect will become entangled, and make it more difficult for the insect to remove itself from the piercing member, the elongated member should be flexibly resilient. The flexibility of the members may be a function of the material from which the member is made, it may be a function of the structure of the member, or it may be a combination of these. More specifically, the flexibility of the member may be ensured by forming the member with a curved or recurved portion (20). This curve/recurved portion (20) provides a natural resilient spring functionality to the elongated member (16). In some instances, as shown in FIG. 2B, the recurved portion is positioned at the distal end of the elongated member such that the overall shape of the insect capture microstructure is of a hook or J-shaped structure. Alternatively, as shown in FIG. 2C the entire elongated member may form a curve, or may be curved to such an extent that the member forms a hoop or a loop. These structures may be hollow or solid, but should be sufficiently flexible that they will deform when interacting with an insect of interest.

Regardless of the nature of the curved/recurved portion of the elongated member (16), a piercing element (18) should be incorporated into the overall functionality of the surface. The piercing member may comprise any member suitable for piercing an insect, including, for example, a rigid straight or curved sharp tip, barb, or hook (18), which is either disposed directly on the substrate or located on the elongated member itself, either at the terminating end of the member or somewhere along the curved/recurved portion (20) of the member.

The dimensions of the elongated member and piercing structure, and their placement may be controlled to increase the probability that a piercing event will incur when the microstructures interact with and pierce an insect. More specifically, the sharpness of the natural trichome points are designed to be sufficiently rigid and sharp to ensure the ability to pierce the target insect. In some embodiments, for example, the piercing microstructure may have a tip dimensioned from about 100-1000 nm, and in some embodiments about 100 to 300 nm. Likewise, as shown in FIG. 2C the sharp point, hook, or barb may be disposed at the terminal end of the elongated member, or along the body of the curved elongated member itself, or on separate structures disposed along the elongated member. In the case of the separate structure it may take any suitable form, but in some embodiments comprises barbed hoops or partial loops. Regardless of the positioning, shape, or nature of the piercing element, in these embodiments the piercing element is formed to be sufficiently rigid and sharp that they are capable of piercing the vulnerable areas on an insect or bed bug, such as the underside of the insect/bug body or legs or tarsus, or other vulnerable area of the body.

In embodiments where the piercing element is located along the elongated flexible member, the member is also dimensioned such that the piercing portion of the member is capable of interacting with the vulnerable portion of the insect of interest. For example, on the bed bug one of the most vulnerable target portions is the underside of the insect, and more particularly the areas on the tarsus underneath the tarsal claws and the intersegmental membrane between the tarsal subsegments, which is approximately 50 to 100 microns in height.

An exemplary structure would be one that mimics the shape and functionality of a plant trichome. However, it should be understood that any structure having suitable length, strength and structural microstructures may be used in association with the insect capture surfaces described herein. Likewise, although embodiments of structures formed from specific polymer materials are described in the sections below, it should be understood that the substrate and insect capture microstructures of the embodiments may be formed from any material having suitable breaking stress properties including, polymeric materials, natural fibers, metals and oxides. Alternatively, the structures may be made of materials or composites that include microengineered structures such as carbon-nanotubes or other such materials. Finally, the breaking stress of the material from which the insect capture microstructures should be formed should match or exceed the breaking stress of a natural plant trichome material, and more specifically the kidney bean trichome. In a rare example of mechanical testing of trichomes, individual bending tests resulted in a range of 1-23 GPa for Young's modulus (flexural) (fruit hooks of Galium aperine). (See, Gorb E V, et al., In Design and Nature: Comparing Design in Nature with Science and Engineering (C A Brebbia, L Sucharov, P Pascolo, Eds.), pp. 151-160. Southampton, UK: WIT Press (2002), the disclosure of which is incorporated herein by reference.) Therefore, in some embodiments the materials used to generate the synthetic surfaces should be comparable in material properties to these trichome walls. Qualitatively, these bend test values demonstrate that plant trichomes have a large breaking strain, as indicated by their ability to bend completely over and elastically return to an upright orientation without breaking. In addition, the curved portions of the trichomes are typically able to straighten and elastically return to their curved configuration when pulled from the negative mold; freeze-fracture of the negative molds showed none of the damage or ripping that would be caused by a non-straightened hook pulling through the material. Therefore, qualitatively the synthetic insect capture microstructures preferably show similar mechanical behavior in this regard.

Figure 2D:
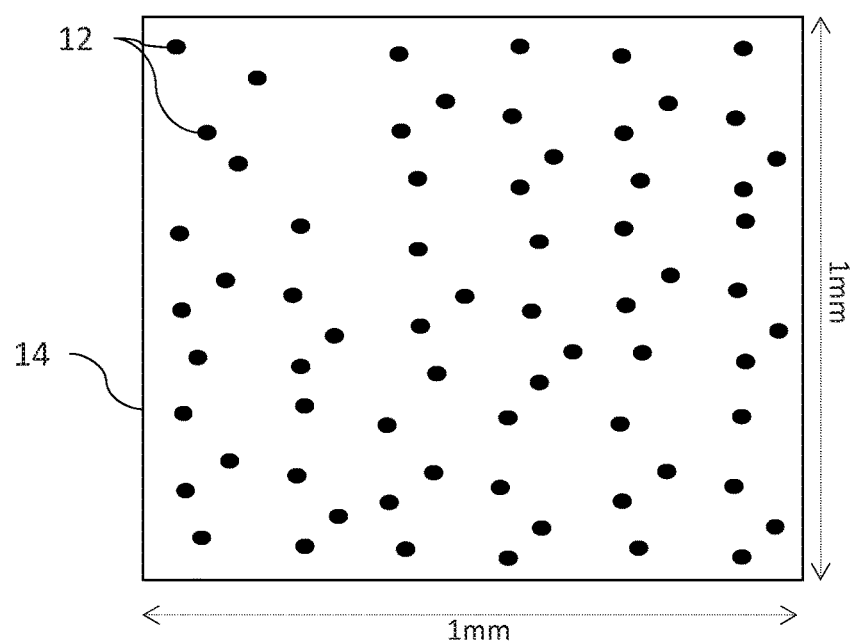

Although the structure of the insect capture microstructures themselves is important, as discussed above it is also important that these microstructures be deposited on the supporting substrate in a manner that will allow them to function to capture the insects of interest. In particular, in embodiments the orientation and density of the microstructures on the substrate can be controlled to improve the performance of the insect capture structures. In particular, in some embodiments the insect capture microstructures are disposed on the substrate with the following constraints:

The insect capture microstructures are disposed on the substrate with a density sufficient that an insect will interact with multiple microstructures simultaneously, and in fact preferably (although not necessarily) that multiple legs of the insect will be captured by the surface at once. Obviously, such a density will be partially dependent on the insect being captured. However in some embodiments, the density of capture microstructures ranges from 30-200 microstructures/square millimeter (as shown in FIG. 2D). Another way of describing the distribution of elements in space is the linear distance between the elements. Under this rubric, in some embodiments the range of the "nearest neighbor" (linear distance from microstructure to microstructure on the surface) ranges from 20-120 micrometers. These microstructures may be arranged randomly (in the two-dimensional space of a leaf surface), or regularly (as in a square or hexagonal grid), or a combination so long as the density of microstructures is adequate.

Figure 2E:
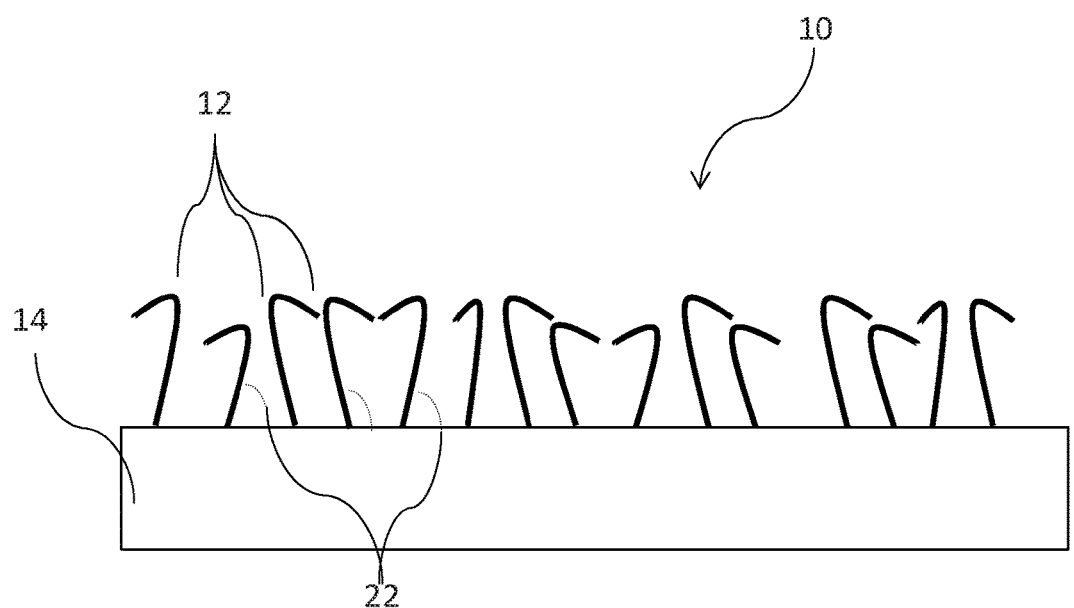

Because it is desired that the microstructures interact with the insect regardless of the orientation of the insect with the substrate, it is preferred that the microstructures are placed on the surface with variable orientation (i.e., the angle of the longitudinal axis of the elongated member (22) to the horizontal plane of the substrate, as shown in FIG. 2E) so that the microstructures will interact with the insect from a variety of angles and orientations.

It should be understood that though specific densities and orientations are described herein that other densities and orientations may be implemented for the specific insect or capture structure used.

Turning to the construction of the substrate, although all of the above embodiments have shown a flat substrate of regular contour, it should be understood that the substrate may take any form suitable for the acceptance of the insect capture microstructures. For example, the substrate may be contoured or curved to conform to any desired surface. Likewise, the plane of the substrate may be undulating or include steps or any other features desired for the specific application, or to enhance the likelihood of entangling the insect. Finally, the substrate itself may be made of any material compatible with the deposition of the insect capture microstructures.

Embodiments of Methods of Forming Insect Capture Surfaces

The invention is further directed to a method for generating such insect capture surfaces. The challenge in the microfabrication of such pest capturing microfabricated surfaces is to accurately reproduce the high aspect ratio microstructures (e.g., sharp-tipped recurved trichomes which are about 50 microns long with a 10 micron diameter) present in the plant surface morphology. Additionally, it is necessary to faithfully reproduce the surface density and geometric orientation of the surface microstructures. Although a number of methods may be used, including three-dimensional growth, etching, deposition, etc., in one embodiment the surfaces are formed with sufficient accuracy using a method based upon a double molding process. (See, e.g., Schulte, A. J., et al., Acta Biomaterialia 2009, 5, 1848-1854; and Koch, K, et al., Bioinspiration and Biomimetics 2008, 3, 046002, the disclosures of which are incorporated herein by reference.)

Figure 3:
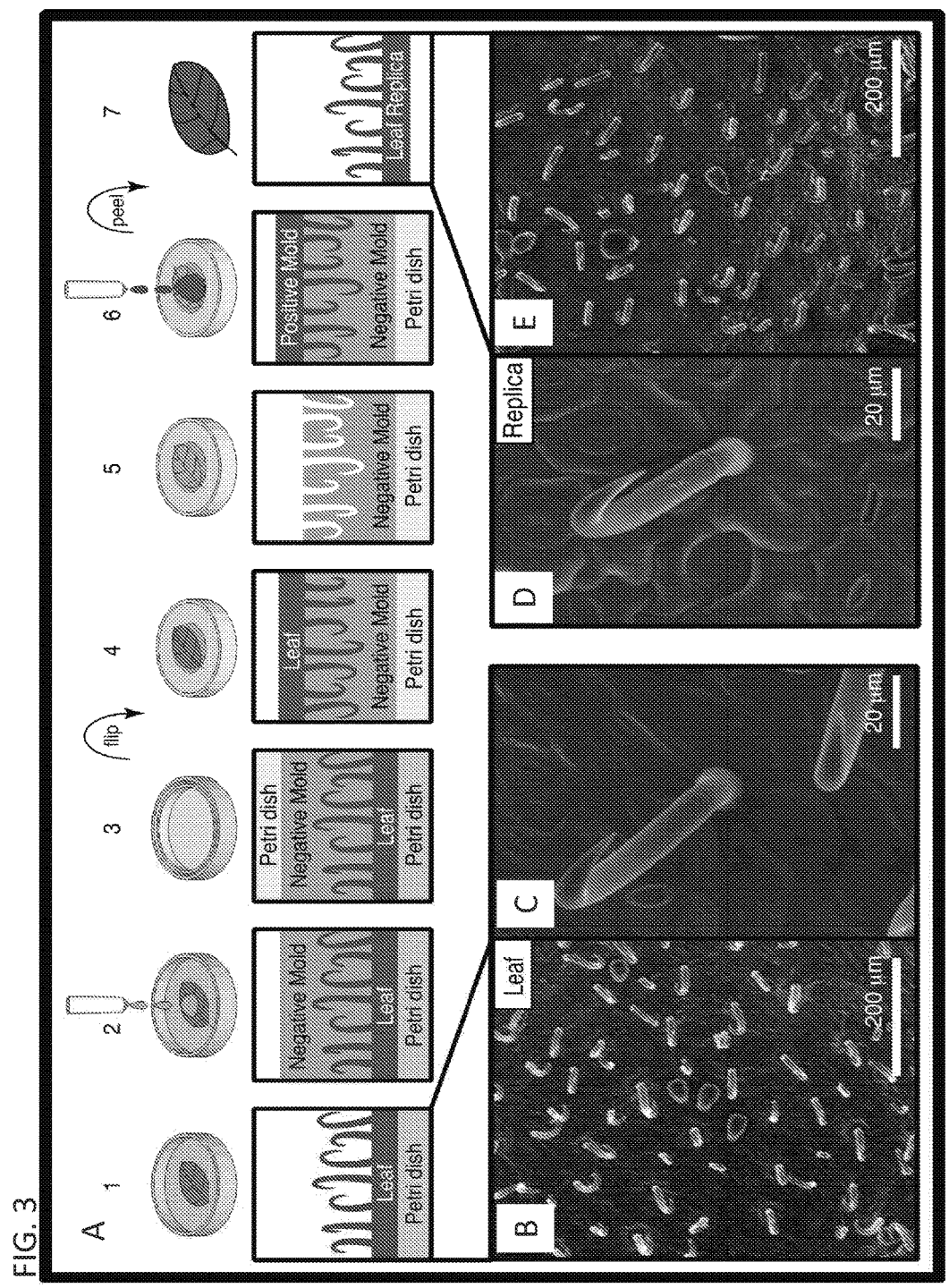
FIGS. 3A to 3E provide: schematics of (A) fabrication of biomimetic surfaces from bean leaves (1-3), a negative molding material is poured onto a leaf surface and pressure is applied (4-6), the leaf is removed, and the negative mold is filled with the positive replica material (7), and the negative mold is removed leaving the biomimetic replica; (B & C) LV-SEM images of the bean leaf show the surface density of trichomes and the recurved, sharp trichome tips; and (D & E) SEM images of the replicate materials appear identical to the natural leaves.

A schematic diagram of embodiments of the microfabrication process according to some embodiments of the invention, and consisting of the seven steps shown in FIG. 3. As shown in Steps 1-3, a desired surface (such as a bean leaf) is impressed into a flexible polymer (President Plus Jet Light Body, a polyvinylsiloxane) thin film in order to create a flexible negative polymer mold (see FIG. 3). In Steps 4-6, the desired surface is removed from this mold and a positive replica is created in the mold using an epoxy-based polymer. Finally, in Step 7, the negative mold is physically peeled off the epoxy thin film to create the active biomimetic insect capture surface.

Although the molding method, using leaves with hooked trichomes as models, has generated extremely promising biomimetic materials for bed bug capture, it should be understood that additional options and modifications may be made to further improve these materials. First, while a molding procedure was used to generate the synthetic surfaces it generates a solid (filled) object, which is necessarily less stiff in bending and twisting than a hollow object. The stalks of the natural trichomes are hollow, while the microfabricated trichomes generated via a molding technique are solid (and therefore less flexible). Accordingly, it might be possible to increase the flexibility of the microstructure by generating thinner (and therefore more flexible) microstructures using different techniques (a non-molding microfabrication method).

Second, methods to manipulate the material properties post-molding may be used, such as adding oxide particles to strengthen the material, and/or adding a metallic coating either by physical vapor deposition or electro deposition. (See, Wetzel, B.; Haupert, F.; Zhang, M. Q., Composites science and technology 2003, 63, 2055-2067, the disclosure of which is incorporated herein by reference.) Also, other plant species offer promising trichome geometries, including *Cynnoglossum officinale* and *Caiophora coronaria*, both of which have barbed hooks on their surfaces. (Koch, K.; Bhushan, B.; Barthlott, W., Progress in Materials Science 2009, 54, 137-178, the disclosure of which is incorporated herein by reference.)

In some embodiments, a micro-needle technology may be used, which would offer the advantage of generating uniformly sharp structures of the proper length scale. (Henry, S.; McAllister, D. V.; Allen, M. G.; Prausnitz, M. R., Journal of Pharmaceutical Sciences 1998, 87 (8), 922-925; and Park, J.-H.; Allen, M. G.; Prausnitz, M. R., Journal of Controlled Release 2005, 104, 55-61, the disclosures of which are incorporated herein by reference.) With pointed polymeric structures the next challenge is to recurve the structures without dulling the sharp points, which can be done with oblique e-beam irradiations or metal deposition. (See, e.g., Kim, T.; Pang, C.; Suh, K Y., Langmuir 2009, 25 (16), 8879-8882; and Choi, M. K.; Yoon, H.; Lee, K; Shin, K, Langmuir 2011, 27, 2132-2137, the disclosures of which are incorporated herein by reference.)

Exemplary Embodiments

Studies were undertaken to identify the essential features of the capture mechanics of bean leaves to guide the design and micro-fabrication of biomimetic surfaces for bed bug capture. The interaction of bed bug tarsi with the microscopic plant trichomes was evaluated by videography and scanning electron microscopy (SEM). Synthetic surfaces were microfabricated using a template method and evaluated for hindrance of bed bug locomotion. In order to validate the fidelity of the proposed replication process, a bean leaf was reproduced and both the negative and the positive molds were examined using standard high vacuum scanning electron microscopy (SEM) techniques. Finally, the ability of these microfabricated surfaces to interfere with bed bug locomotion has been evaluated by recording movies of live bed bugs running on these fabricated surfaces. In the study, bugs are dropped onto the hooked material and recorded for a minimum of one minute, and it is shown that the bugs are hooked on the inventive micro fabricated surfaces. The surfaces are scored by the number of steps a bug takes until it appears to have trouble moving any tarsi (feet), in parallel with the studies of bug movements on the natural leaf surfaces.

Material and Methods

Experimental Organisms

Kidney beans (*Phaseolus vulgaris* L.) were raised from seeds (Johnny's Seeds, Product 2554). Individual leaves (trifoliate, node≥1) were severed where the base of petiole met the stem, were sealed in bags with moistened paper to remain hydrated prior to experimentation, and were used within a few hours. Bed bugs (*Cimex lectularius*) were raised at the University of Kentucky and were not fed within three weeks before use. All bugs used were male adults.

Imaging Techniques

Digital movies were acquired on a Sony HDR-CX100 at 30 frames/s with a resolution of 2016 pixels by 1134 pixels (this corresponds to a spatial resolution of 0.1 mm for the field of view used). The camera was positioned in a vertical orientation (viewing a bug on a surface dorsally from above), while the leaf or synthetic surface was oriented horizontally. A leaf or its synthetic analog was placed with the abaxial side (undersurface) facing upward, and a single bug was introduced to the center of the surface by gently tipping the bug from a glass vial approximately 2 cm above the surface. The abaxial side usually has a greater density of hooked trichomes than the adaxial side in many species, including *Phaseolus vulgaris* [9-11, 18, 19] although this is not universal [20, 21]. (Riddick E W, Wu Z., *Biocontrol* 56, 55-63 (2010); Johnson B., *B. Entomol. Res.* 44, 779-788 (1953); Jeffree C E., *Insects and the Plant Surface* (B Juniper, R Southwood, Eds.), pp. 23-64. London: Edward Arnold Ltd. (1983); Dahlin R M, et al., *Econ. Bot.* 46, 299-304 (1992); Bauer G, et al., P. *Roy. Soc. B-Biol. Sci.* 278, 2233-2239 (2011); Stenglein S A, et al., *Aust. J. Bot.* 52, 73-80 (2004); and Pillemer E & Tingey W., *Science* 193, 482-484 (1976), the disclosures of which are incorporated herein by reference.) All recordings were made at ambient temperature (22-24° C.).

All SEM imaging was performed on a FEI Quanta 3D FEG Dual Beam SEM (FEI, Hillsboro, Oreg.). For low-vacuum SEM (LV-SEM), captured bugs on leaves were prepared by cutting the leaf around the captured bug to a size approximating the size of an SEM stub, and mounting the leaf piece with its attached bug on the SEM stub with copper tape. In order to confirm and quantify the number of piercing trichomes, every specimen was repeatedly tilted to view underneath the tarsi of all six legs. LV-SEM images were attained at a pressure of 0.6 mbar and 5 kV with water as the ionizing gas. Bugs were still alive and resumed struggling after removal from the LV-SEM.

For high vacuum SEM (HV-SEM) imaging of replica materials, samples were sputtered with iridium (IBS/e, South Bay Technology, Inc) with a 60-degree tilt angle and constant rotation for 4 minutes (~5 nm Ir). Images of the microstructures were acquired at 5 kV.

EDS (50 mm X-MAX, Oxford Instruments, INCA 4.15) was performed using the FEI Quanta 3D FEG Dual Beam SEM (FEI, Hillsboro, Oreg.) on samples at 10 kV with a current of 0.75 nA at a working distance of 8 mm. Elemental mapping was executed over the desired area for 230 s to determine the presence of silicon. Carbon, oxygen, sulfur, and iron were also imaged as controls to account for the topography of the sample surface. Synthetic surfaces were prepared as described above for HV-SEM imaging including sputtering with iridium. Natural leaf controls used the same EDS parameters, but in LV-mode at 0.6 mbar and without sputtering.

Techniques Used to Study the Locomotion Hindrance of Bugs by Surfaces

Digital movies were reviewed to identify changes in bug locomotion associated with mechanical interactions with the natural leaf or synthetic surfaces that interrupted normal movements. Incidents of momentary or prolonged struggling by the bug as one or more legs were stuck in place were tabulated. The number of locomotory cycles until a bug experienced a momentary snag and until capture by a leaf were counted. One locomotory cycle refers to a single step taken by each of the six legs. The number of steps was used rather than time because bugs vary in their walking speed and number of pauses on the surface like most insects. Also, the number of locomotory cycles directly represents the number of opportunities for leg/trichome encounters that can lead to piercing. Each bug was only used once.

Measurement of the Retention of Insects on Leaves after Initial Capture

In order to determine if a bug could move on a surface after its initial capture, a time series of static images was attained for captured bugs (n=6). After capture by a leaf surface, an initial photo was immediately taken documenting the location of capture (using the same camera described above). Subsequent photos were taken after 10, 20, and 30 minutes. Images were imported into image analysis software (Canvas 12, ACD Systems International, USA), stacked, and oriented on top of one another, lining up the leaf outlines. A circle (4 mm diameter) was centered over each bed bug for each of the four images and the center-to-center distance between these circles was calculated. It was estimated that a displacement of approximately 6 mm of the circle center would result if a captured bed bug was able to rotate about a single leg impaled at its tip, and therefore a displacement of greater than 6 mm would indicate that the bug was able to free itself during that time interval.

Measurement of Trichome Density

Trichome density (number of trichomes per area of leaf surface) was measured on leaves with captured bugs, close to the points of capture. The lengths of these leaves ranged from 69-124 mm (base to tip, not including petiole); trichome density was not significantly related to leaf length ($r2=0.36$, n=10, slope of regression line is not significant at the $P=0.05$ level) and therefore leaf length was not included in other statistical analyses. LV-SEM images of the leaf surfaces were acquired, opened in ImageJ, and all trichomes on those images counted. An average of 39 trichomes were counted over an average area of 0.44 mm$^2$ per leaf (n=11 leaves).

Microfabrication Techniques

Using kidney bean leaf surfaces as templates, biomimetic polymeric surfaces have been constructed for the capture of bed bugs (FIG. 3A). Some methods for generating biomimetic leaf surfaces are based upon a double molding process that had been shown to reproduce complex leaf architectures. (See, Koch K, et al., Bioinspir. Biomim. 3, 046002 (2008); Schulte A J, et al., Acta Biomater. 5, 1848-1854 (2009); and Koch K, et al., Prog. Mater. Sci. 54, 137-178 (2009), the disclosure of which is incorporated herein by reference.) First, a leaf was placed in a petri dish (100 cm$^2$ area) with its abaxial (undersurface) side facing upward. The negative polyvinylsiloxane molding material (President Plus Jet Light Body, Affinis Light Body, or Affinis-Fast Light Body, Coltene-Whaledent, Inc.) was then poured onto the leaf surface and the other side of the petri dish was placed on top of the negative molding material with pressures ranging from 2 to 10 g/cm$^2$ during polymerization. The leaf was then peeled off of the negative mold. The negative mold was subsequently filled with a positive molding material and left to dry overnight prior to removal. A variety of polymeric positive molding materials, various epoxies and glues with different hardening rates and resin:hardener ratios were used in order to generate artificial trichomes with mechanical properties that span the largely uncharacterized properties of natural trichomes (FIGS. 3B to 3E). For example, epoxies have Young's moduli (tensile) in the range 0.8-4.2 GPa were use, which compare well to plant cell walls (0.1-70 GPa). (See, e.g., Wetzel B, et al., Compos Sci Technol 63, 2055-2067 (2003); Zheng S & Ashcroft I A, J. Adhes. Adhes. 25, 67-76 (2005); Lilleheden L., Int. J. Adhes. Adhes. 14, 31-37 (1994); Burst N, et al., J. Adhesion 87, 72-92 (2011); Katnam K B, et al., Int. J. Adhes. Adhes. 37, 3-10 (2012); Vincent J F V., J. Exp. Biol. 202, 3263-3268 (1999); Vincent J F V. 1990 Structural Biomaterials Princeton, N.J.: Princeton University Press; Hiller S, et al., J. Texture Stud. 27, 559-587 (1996); Gibson L J, et al., 2010 Cellular Materials in Nature and Medicine Cambridge, UK: Cambridge University Press.; and Gibson L J, et al., J. R. Soc. Interface 9, 2749-2766 (2012), the disclosures of which are incorporated herein by reference.) Some exemplary materials include: Loctite Heavy Duty Quick Set Epoxy (Henkel Corp.), Loctite Epoxy Extra Time (10:4 ratio, 1:1 ratio) (Henkel Corp.), T88 epoxy (Systems Three Resins, Inc.), Titebond III Wood Glue (Franklin International), Bob Smith Mid-Cure 15 min Epoxy (Bob Smith Industries, Inc), and Bob Smith Slow-Cure 30 min Epoxy (Bob Smith Industries, Inc).

Accurate replication of the sharp trichome tips is presumably crucial to facilitate piercing of the bed bug cuticle by synthetic trichomes. The sharpness of both natural and synthetic trichome tips was measured for several representative surfaces to the nearest half pixel (~100 nm) in ImageJ software using SEM images to evaluate whether the synthetic trichomes were sufficiently sharp.

Incorporation of Natural Trichome Tips into Hybrid Microfabricated Surfaces

In addition to generating completely synthetic surfaces, it was also possible to create hybrid synthetic surfaces with some percentage of natural trichome tips incorporated onto synthetic trichome stalks. Synthetic trichome tips can be indistinguishable from natural trichome tips in SEM (FIGS. 3C & 3D) and therefore special analytical techniques are required to unambiguously identify whether a tip is natural or synthetic. Energy dispersive X-ray spectroscopy (EDS) was used to reliably identify natural trichome tips by looking for the chemical signature of silicon, which was present in large amounts in the natural trichome tips, but not in the synthetic polymers used. (See, Dahlin R M, et al., Econ. Bot. 46, 299-304 (1992); and Perry C C., *Insects and the Plant Surface* (B Juniper, R Southwood, Eds.), pp. 345-346. London: Edward Arnold Ltd. (1986), the disclosures of which are incorporated herein by reference.) EDS mapping was used to estimate the percentage of natural tips on the microfabricated surfaces. Analysis of hybrids was performed by corroborating the elemental silicon maps with the electron image in the *INCA* software. Four representative areas (each of typical size approximately 0.25 mm², e.g. FIG. 3E) per surface were analyzed and their trichome counts summed (an average of 93 trichomes were analyzed per surface). A trichome was deemed "hybrid" if there were more than 3 pixels with silicon signal that matched with a trichome in the electron image. The percent of hybrid trichomes was calculated from the number of hybrid trichomes (from the Si images) divided by the total number of trichomes (from the electron images). The percentage of natural tips ranged from 0-100% in the 38 microfabricated surfaces that were characterized by EDS mapping.

Any natural trichome tips incorporated into synthetic surfaces must have snapped off the natural leaf, and therefore broken trichomes should be visible on the natural leaf after being used to generate the negative mold. To verify this step in the molding process, LV-SEM was used to examine the number of broken trichomes on a set of natural leaves after molding. This analysis also used four images acquired on each leaf at different locations. The trichomes on each image were tallied to determine the number of sharp, intact trichome tips and the number of broken tips on the natural leaf surface. The data acquired for the four images were summed and the percentage of broken trichomes was calculated for each leaf; results ranged from 0-95% broken tips per leaf. Statistical analyses confirmed that there was a significant correlation between the percentage of broken tips on a leaf surface and the percentage of the number of hybrid trichomes on the fabricated surface made from that particular leaf (r2=0.50, n=30, P<0.0001, linear regression).

Figure 4:
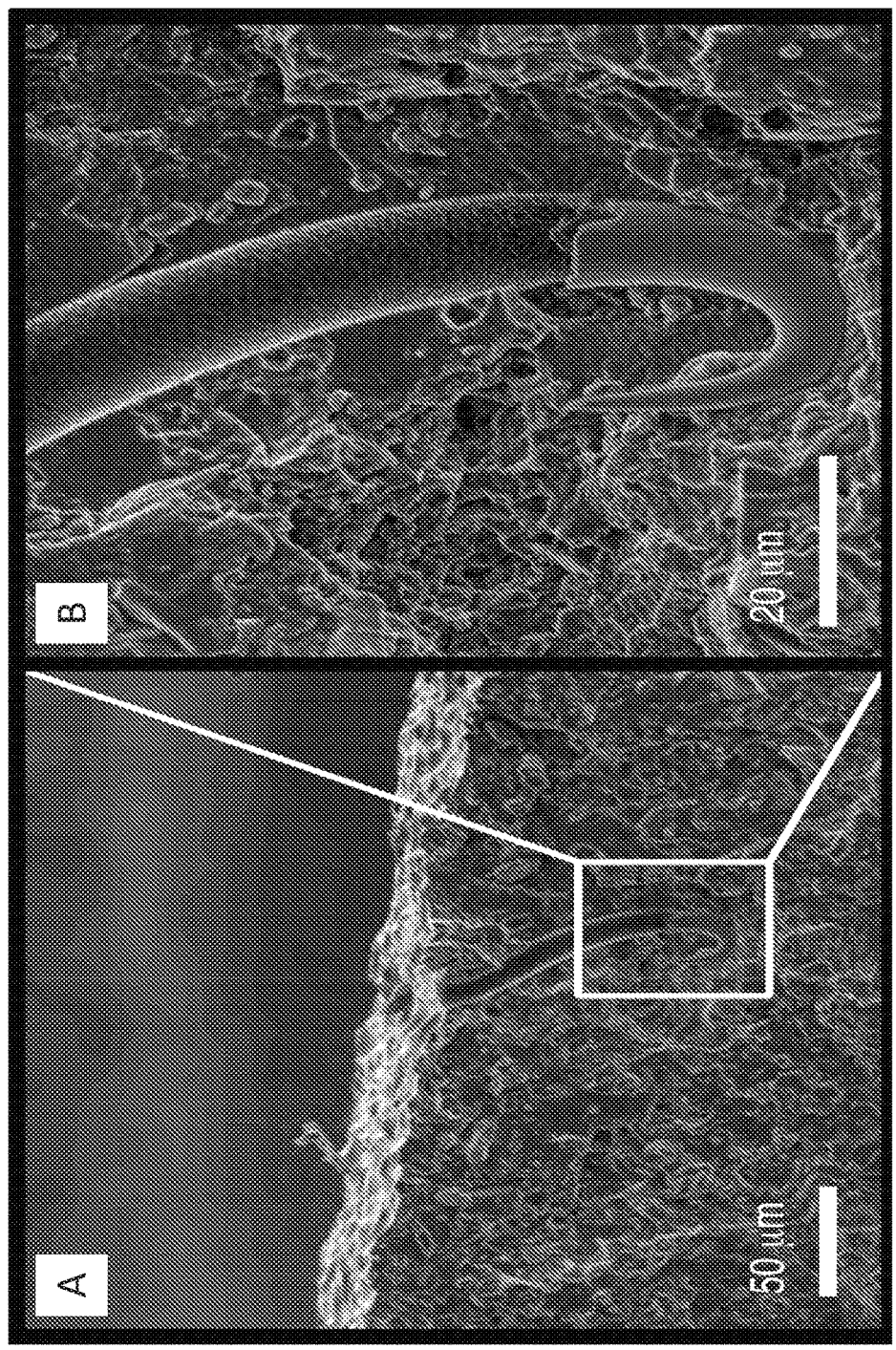
FIGS. 4A & 4B provide SEM images of a cross-section of negative molding material showing an embedded natural trichome tip that has broken off the natural leaf trichome during molding.

The presence of broken natural trichome tips in the negative molds after leaf removal was confirmed using SEM (FIG. 4). The negative polyvinylsiloxane molds were prepared for this analysis by freeze-fracturing to generate a crack without surface deformations and mounted at a 90° angle with silver paint in order to observe the interface. These samples were sputtered (~5 nm Ir) and observed in HV-SEM at 5 kV. The images show that there are occasionally residual natural tips in the negative mold.

Generating a Standard for Comparison with Natural Leaves

The number of locomotory cycles before a bed bug exhibited a snag while running on a synthetic surface was compared to that measured on natural leaves. However, a synthetic surface includes both synthetic and hybrid trichomes. If only hybrid trichomes (with natural trichome tips) are capable of snagging or capturing bed bugs, the number of expected locomotory cycles to snag or capture can be estimated from the proportion of trichomes that are hybrid. A conservative approach was used in the choice of a standard of 19 locomotory cycles (the 90th percentile for the number of locomotory cycles that led to capture on natural leaves, n=11 bugs). For each hybrid surface characterized by EDS (n=26 out of the 38 synthetic surfaces; 12 had zero hybrids), the number of locomotory cycles on a hybrid surface that would be expected to result in capture 90% of the time (number of locomotory cycles=19/(percentage of trichomes that were hybrid)) was clcuated. The number of locomotory cycles was counted for a bug running on a synthetic surface until a momentary snag was observed (up to a maximum of 200 cycles or the expected number based on the hybrid percentage, whichever was smaller). This made it possible to compare the performance of the different surfaces in causing difficulties in locomotion.

Assessing Damage to Synthetic Surfaces

One possible reason that surfaces might not capture bed bugs could be if the hooks on the hybrid surfaces simply snapped off without impaling the bed bugs. In order to evaluate whether hooks snap off when walked on by bugs, three surfaces were examined in SEM both before and after extensive exposure to bug contact during walking. These samples were attached to SEM stubs, and examined under LV-SEM for hook number and integrity on four different areas (each with a surface area of 2 mm²) on each of the three surfaces. The total area of each of the three samples of surfaces examined was approximately the same as the SEM stub: 130 mm². The approximate surface contact area for all six tarsi of a single male adult bed bug is 0.15 mm². Therefore 870 locomotory cycles on average would be required for each part of a 130 mm² surface to be stepped on once (assuming each 0.15 mm² step is on a new area). In order to conservatively ensure that each part of the surface would get stepped on at least once, 10 bugs were placed on each surface (sealed inside a vial) and rotated slowly at 8 revolutions/minute (Barnstead Thermodyne Labquake Rotisserie Model C400110) to gently agitate the bugs so that they continued to walk over the surface for 18 hours; the total area impacted by 60 bug feet with 8 locomotory cycles/minute on average over an 18 hour period would be 10 times the area of the surface. After the surfaces had been thoroughly walked on by bugs as described, the same locations on these surfaces were re-evaluated in SEM. Comparison of the before and after images confirmed that no hooks had been broken and that the bed bugs were not damaging the synthetic surfaces.

Statistical Analyses

All analyses were performed using SAS statistical analysis software (Version 9.2; Cary, N.C.).

EXAMPLE 1

Mechanism of Bed Bug Capture by Bean Leaves

Figure 5:
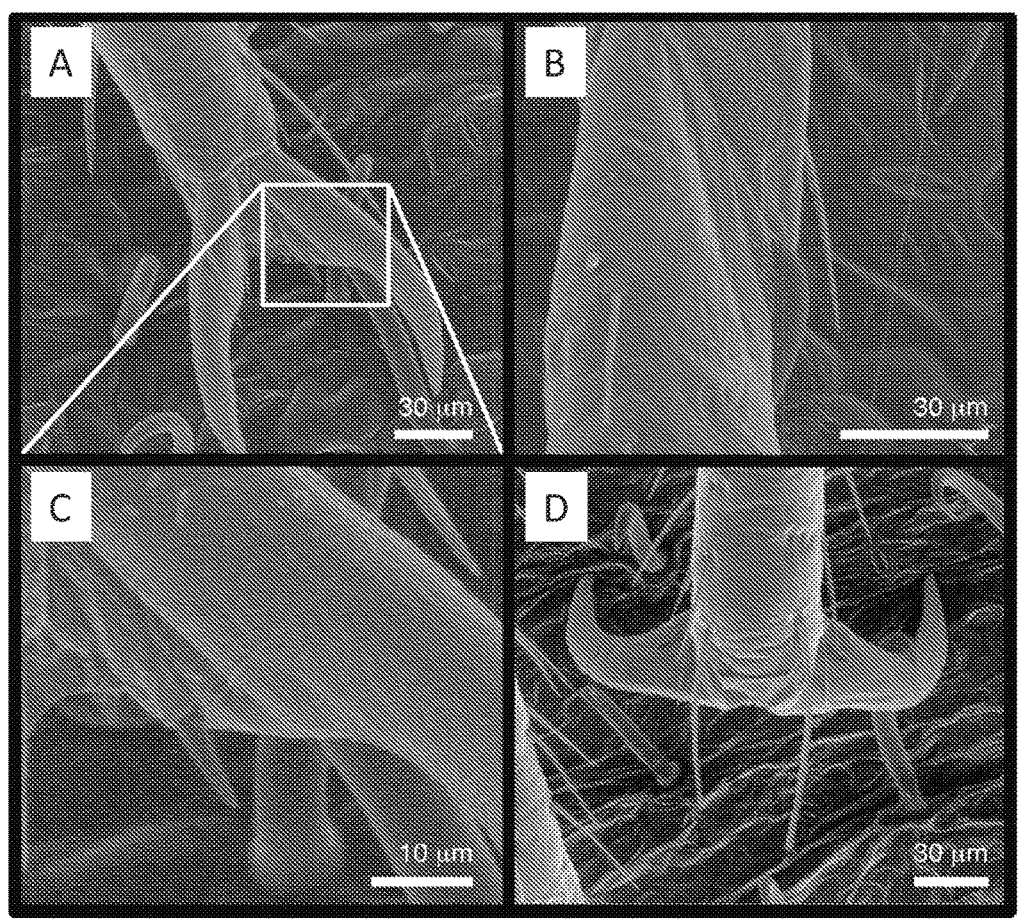
FIGS. 5A to 5D provide: LV-SEM images of bed bug legs on bean leaf surfaces with hooked trichomes, where (A) shows piercing under a pretarsal claw leads to capture of a bug by a leaf, (B) piercing occasionally occurs at a tarsal intersegmental membrane, also causing capture of a bug, (C) a higher magnification of piercing from (A), and (D) in contrast, hooking causes momentary snags of a bug leg.

In order to evaluate the capture effectiveness of natural leaf surfaces, bed bugs were placed individually onto kidney bean leaves (*Phaseolus vulgaris* L.) and their movements recorded as digital movies. As a bed bug walked on a leaf, entanglement of any legs by trichomes caused a visible change in its walking behavior. It was possible to identify two discreet categories of entanglement: (1) a momentary snag of a leg with the bug able to break away (usually within a second), and (2) a more lengthy and irreversible snag in which a visibly struggling bug is unable to pull away and is therefore considered "captured" by the leaf. It was usually impossible to see details of the trichome-bed bug interaction in situ using light microscopy because the trichomes are very small (~10 microns in diameter and 50-100 microns high) and were often underneath the tarsi. In order to visualize the actions of the trichomes that corresponded to capture, live captured bed bugs were examined on leaves using LV-SEM after recording their capture. Every bug captured by a leaf had at least one piercing on one leg by a trichome (n=18 bugs). "Piercing" was defined as a clear and unambiguous penetration of the insect cuticle by the trichome tip (FIGS. 5A to C); tilting the specimen was usually required for such confirmation because piercing generally occurred on the underside of the foot. The same legs that appeared irreversibly snagged on the leaves in the movies of the struggling bugs were confirmed as pierced in LV-SEM. Therefore, it was possible to conclude that piercing is necessary for capture. Occasionally some legs were hooked by the trichomes (FIG. 5D), and we inferred that this hooking could lead to momentary snags.

Bed bugs were captured fairly quickly when walking on kidney bean leaves. Typically, a bug showed a visible momentary snag after only six locomotory cycles (one locomotory cycle refers to a single step taken by each of the six legs) (median reported, range 0-13 cycles, "0" means that the bug displayed snagging behavior immediately on introduction to the surface, n=11 bugs), and was captured after only nine cycles (median, range 0-39 cycles, n=11 bugs). This means that a bed bug was usually captured within seconds after placement on a leaf. Bed bugs continued to struggle after being pierced by a trichome, and the struggling movements often led to more piercings of the bug on the same or additional legs. Additional piercings can occur because the trichomes are of sufficient density that all legs are surrounded by trichomes (FIG. 1B) (average 99 trichomes/mm$^2$, sd=53, n=11 leaves; this trichome density is comparable to that reported in the literature for *P. vulgaris*). (See, Pillemer E & Tingey W., *Science* 193, 482-484 (1976), the disclosure of which is incorporated herein by reference.) Examination of all legs of a set of captured bugs in LV-SEM showed an average of 3.8 piercings/bug (range 1-7 piercings/bug, n=6 bugs, 36 legs). The most common location for piercing was underneath the pretarsal claws (FIG. 5A, c; 61% of the 23 piercings on the six bugs). The other common location on the legs where piercing occurred was in the intersegmental membrane between the 1st and 2nd tarsal subsegments (FIG. 5B; 30% of the 23 piercings on the six bugs; tarsal subsegments were counted from proximal to distal).

Figure 6:
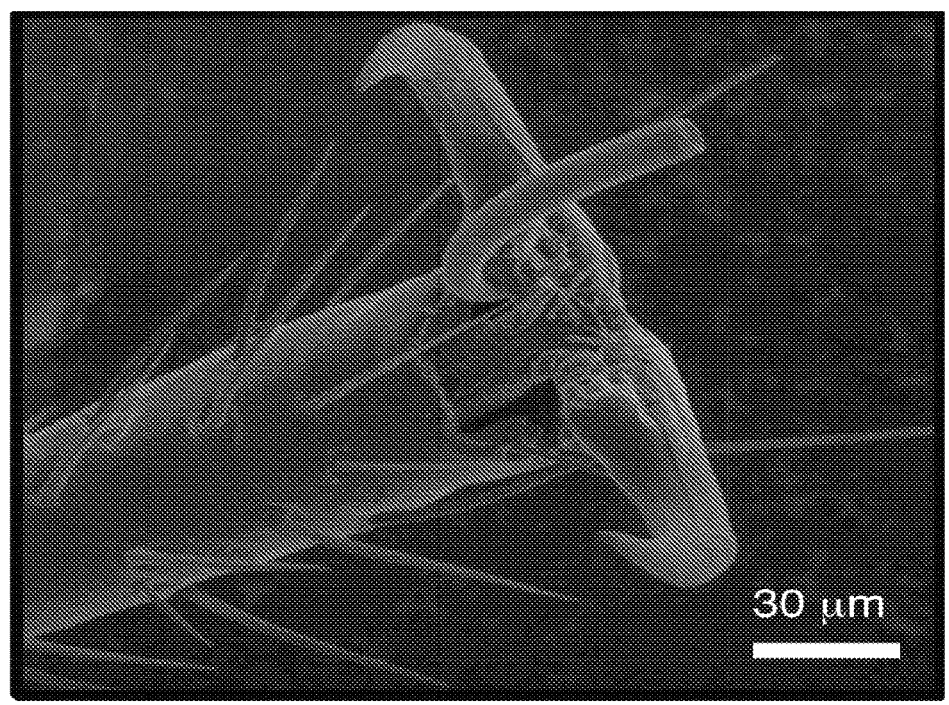
FIG. 6 provides an image of the underside of a bed bug tarsus showing a dangling broken trichome as evidence of piercing.

To monitor whether captured bugs were able to free themselves from a leaf, photographs were taken of bug positions on leaves at ten-minute intervals for thirty minutes following capture. The average displacement of a bug thirty minutes after capture on a bean leaf was only 3.2 mm (range 1.4-9.9 mm; n=6 bugs), consistent with rotation in place around a pierced leg (~6 mm, see above). Captured bugs struggled, but were only rarely able to generate enough force to pull free of a piercing trichome (by breaking the trichome or ripping the insect cuticle), and usually immediately got recaptured on the leaf. If a bug was able to break a trichome, there should be evidence on the undersurface of the leg. To measure this some bugs were forcibly detached from leaves by pulling straight up with forceps, and immediately examined them upside-down in LV-SEM to look for attached broken trichomes or physical damage to the underside (ventral surface) of the bug legs, which would provide such evidence. In 8 out of 9 cases, it was possible to identify at least one broken trichome still attached to the bug (FIG. 6), and in the remaining case, there was evidence of damage (leaking hemolymph in the pierced location). Therefore it was possible to confirm earlier piercings from damage on the undersides of bug tarsi. Bugs that had been momentarily snagged, but not captured by leaves, never exhibited any evidence of piercing when examined using LV-SEM; presumably their legs had only been hooked.

EXAMPLE 2

Microfabrication and Characterization of Biomimetic Surfaces

The bean leaves captured bed bugs so quickly and effectively that a logical starting place for microfabrication of a capturing surface for bed bug control is to faithfully reproduce the leaf trichomes with the relevant surface density and orientation. The hardest challenges in the microfabrication of the high aspect ratio trichomes on a replicate bean leaf surface are to accurately reproduce the sharp tips and the recurved shapes.

Synthetic surfaces were generated with indistinguishable trichome geometry and hook point sharpness seen in natural leaves (FIGS. 3A to 3E). The kidney bean trichomes had an average tip sharpness of 220±35 nm (mean±1 standard deviation, n=16 trichomes from 16 different leaves) and the synthetic replicas had an average tip sharpness of 230±50 nm (mean±1 standard deviation, n=27 from 27 different synthetic surfaces); tip sharpness is not significantly different in a one-way ANOVA (P=0.49). Therefore the method is accurately duplicating the geometry of the microstructures on the natural surfaces.

Figure 7:
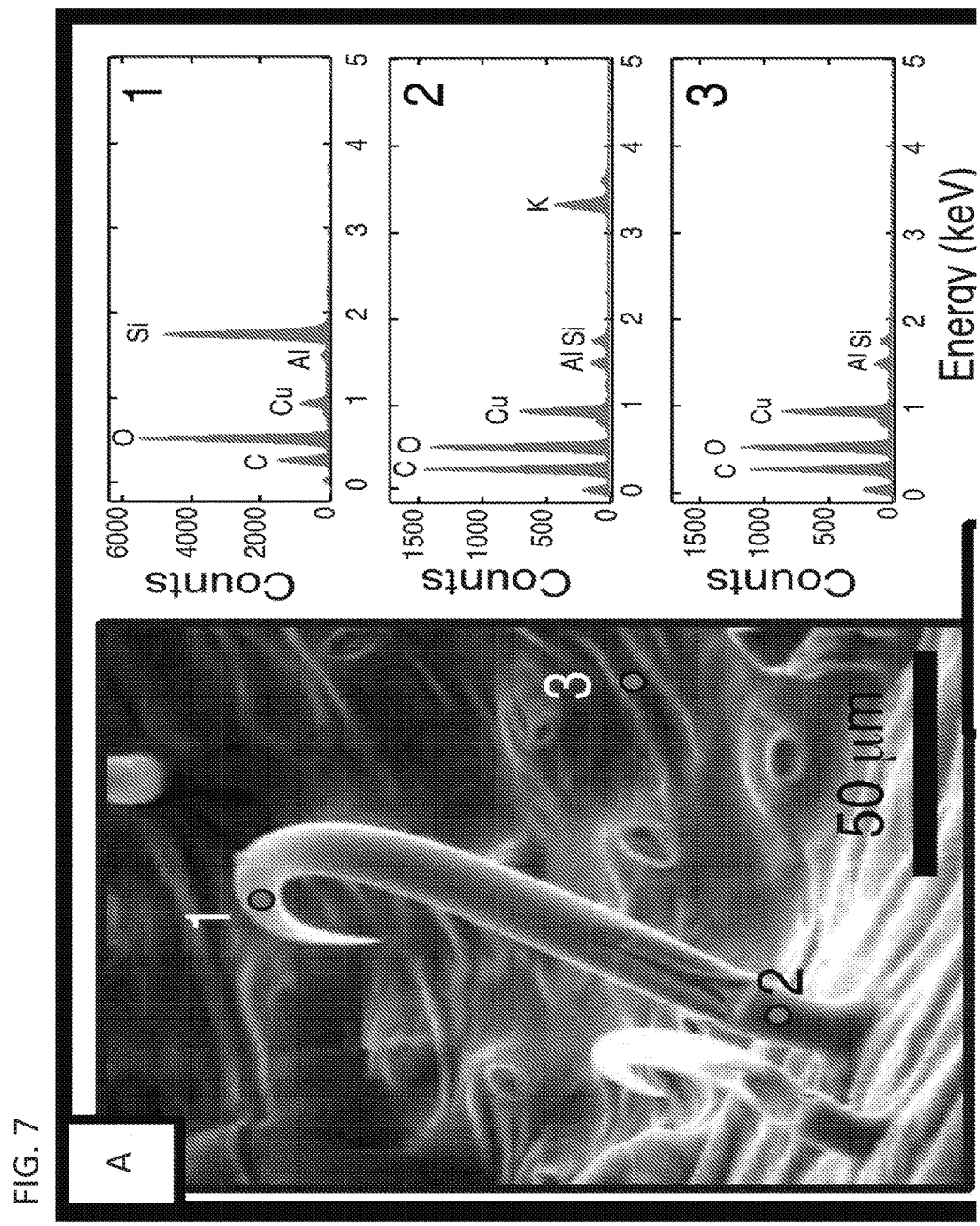
FIGS. 7A to 7D provide images showing the discrimination between natural and synthetic trichome tips on hybrid surfaces using energy dispersive spectroscopy (EDS), where (A) is an LV-SEM image of a trichome on a natural bean leaf surface and the locations of EDS spectra are identified ((a1) shows a strong silicon signature compared to the base (a2) and leaf surface (a3)); (B) shows an SEM image showing both a hybrid tip (b1) and non-hybrid tip (b2) and their corresponding EDS spectra showing the presence or absence of detectable silicon respectively; (C) shows EDS mapping of trichomes on the leaf surface showing the presence of silicon on the natural trichomes; and (D) shows a representative synthetic surface showing examples of natural trichome tips incorporated into the polymer surface (indicated by the presence of silicon) along with an example of a fully-synthetic trichome (indicated by the circle).
Figure 7:
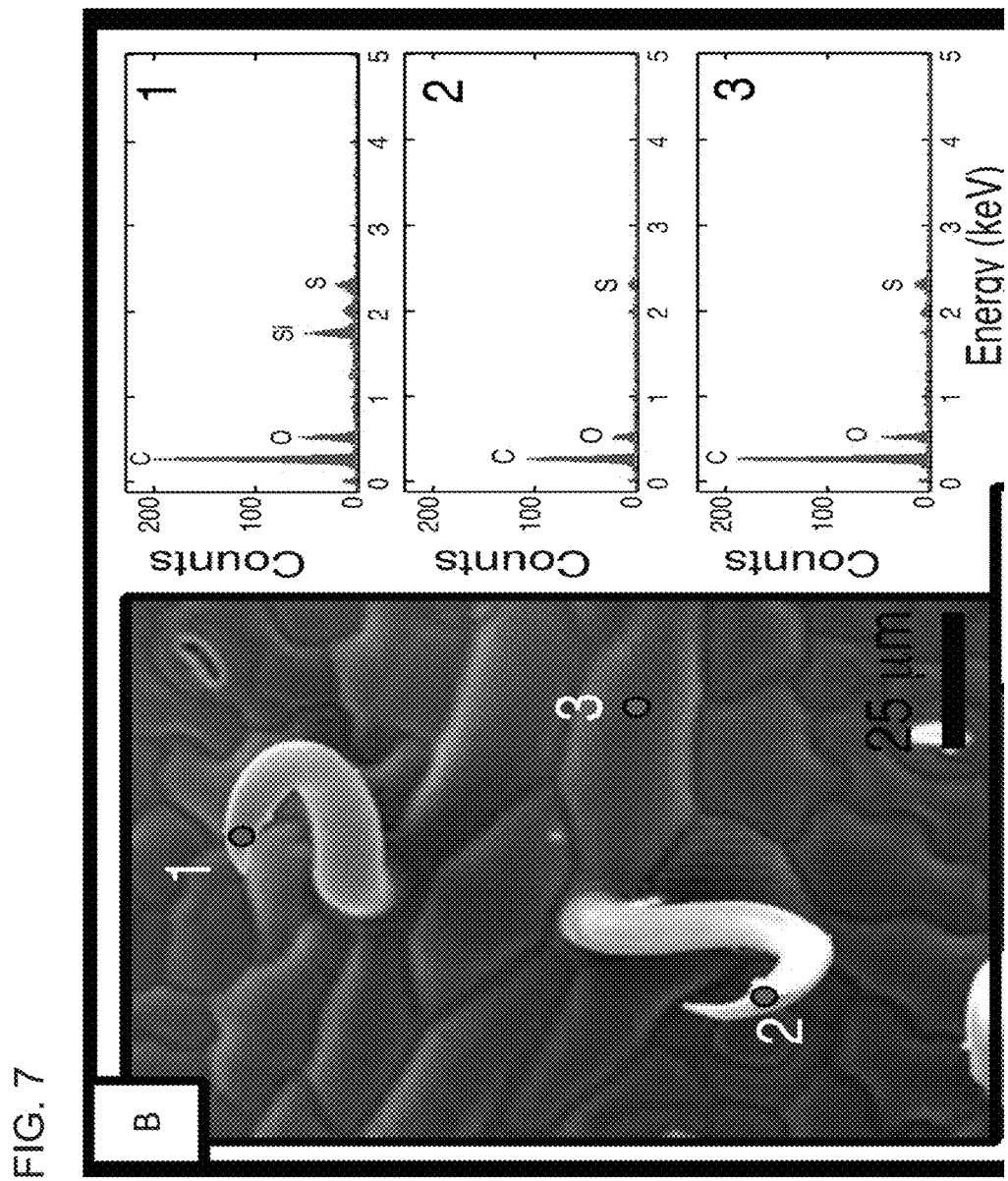
Figure 7:
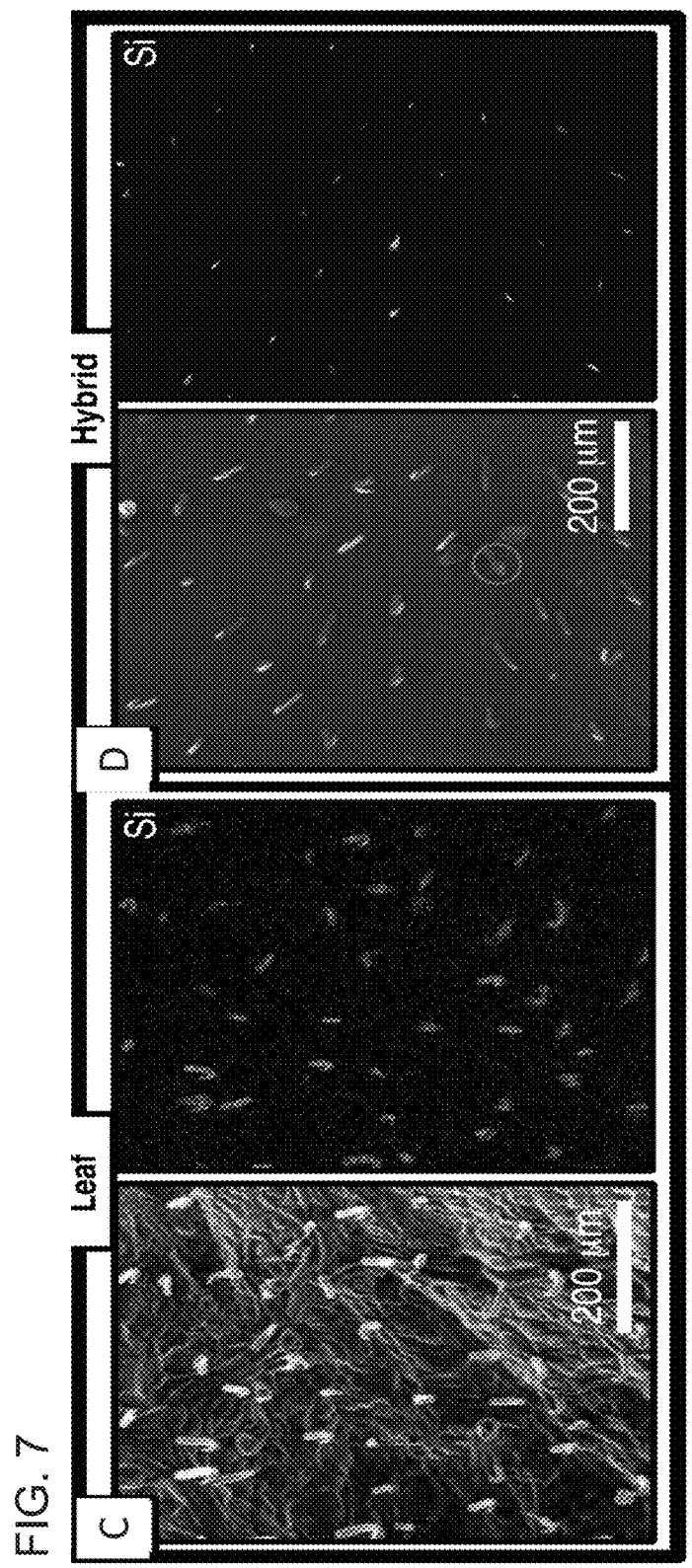

Serendipitously it was discovered that natural trichome tips would sometimes be retained in the negative mold material (FIG. 4) and become incorporated into hybrid surfaces (FIG. 7). This allowed us to generate surfaces that had trichomes with natural piercing hook tips attached to synthetic stalks (hybrid trichomes). The natural tips were usually indistinguishable in appearance from synthetic tips when viewed in SEM (FIG. 7B). Therefore to reliably identify natural trichome tips, energy dispersive X-ray spectroscopy (EDS) was used to look for silicon, which was present in large amounts in the natural trichome tips (FIGS. 7B & 7C), but not in the synthetic polymers used (FIG. 7*b*). EDS mapping was used to estimate the percentage of natural tips on the microfabricated surfaces (FIG. 7D). The percentage of natural tips ranged from 0-100% in the 38 microfabricated surfaces that were characterized by EDS mapping.

If the hybrid trichomes (with natural tips) are able to hook or pierce the bed bugs, but the completely synthetic trichomes are not, synthetic surfaces with a larger percentage of hybrid trichomes should interfere more with bed bug locomotion than synthetic surfaces with fewer hybrid trichomes. Therefore the number of locomotory cycles expected to generate a snag or capture could be predicted by correcting a conservative standard (19 locomotory cycles, the 90th percentile for capture on natural leaves) for the percentage of hybrid trichomes estimated using EDS. Only 4 out of 26 bugs showed a momentary snag without capture during the number of locomotory cycles that would be expected to result in capture 90% of the time for their particular surface.

If the bugs were not captured by synthetic surfaces because they were able to break the synthetic or hybrid trichomes, broken trichomes should be evident on the microfabricated surfaces after bugs ran on them. In order to evaluate whether trichomes on microfabricated surfaces are snapped off by the bugs, SEM images of three surfaces were compared both before and after ten bugs were confined on each surface for 18 hours (the surfaces were rotated constantly to keep the bugs moving). Not a single broken trichome was observed out of the several hundred trichomes viewed, suggesting that neither synthetic nor hybrid trichomes are breaking when the bugs are walking on them.

Figure 8:
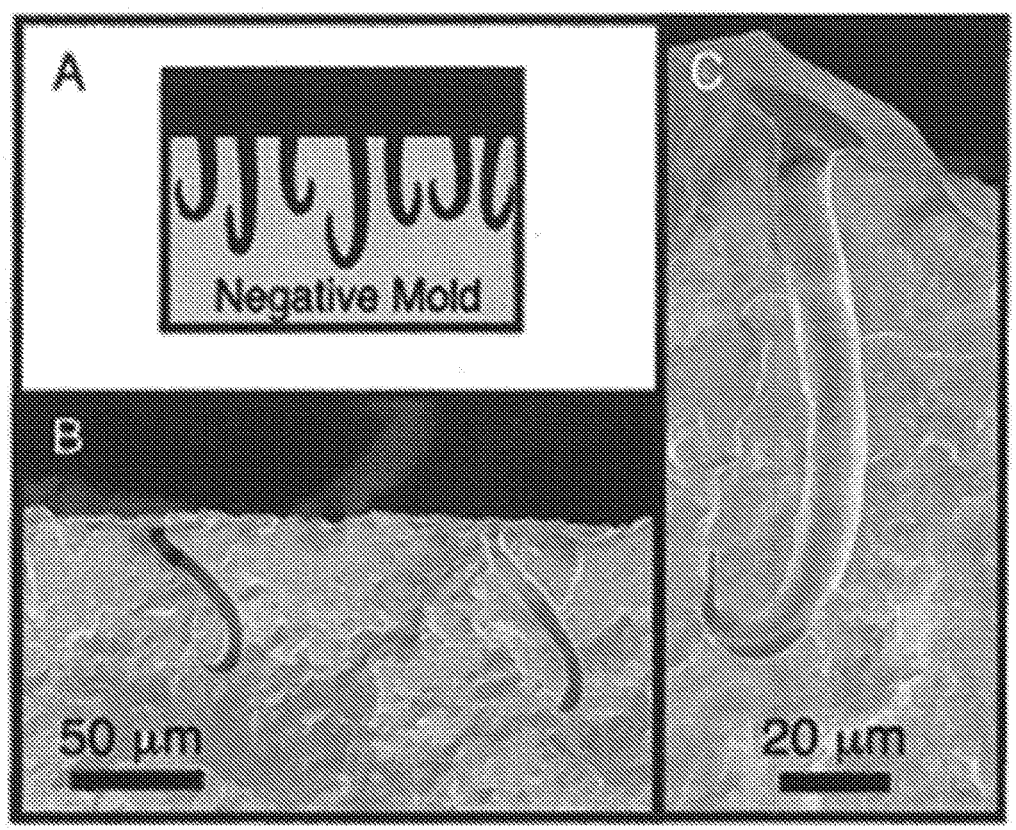
FIGS. 8A to 8C provide: (A) diagrams, and (B & C) SEM images demonstrating the successful molding of the hooked trichomes of *Phaseolus vulgaris* (Kidney bean) in polyvinylsiloxane (the negative mold).
Figure 9:
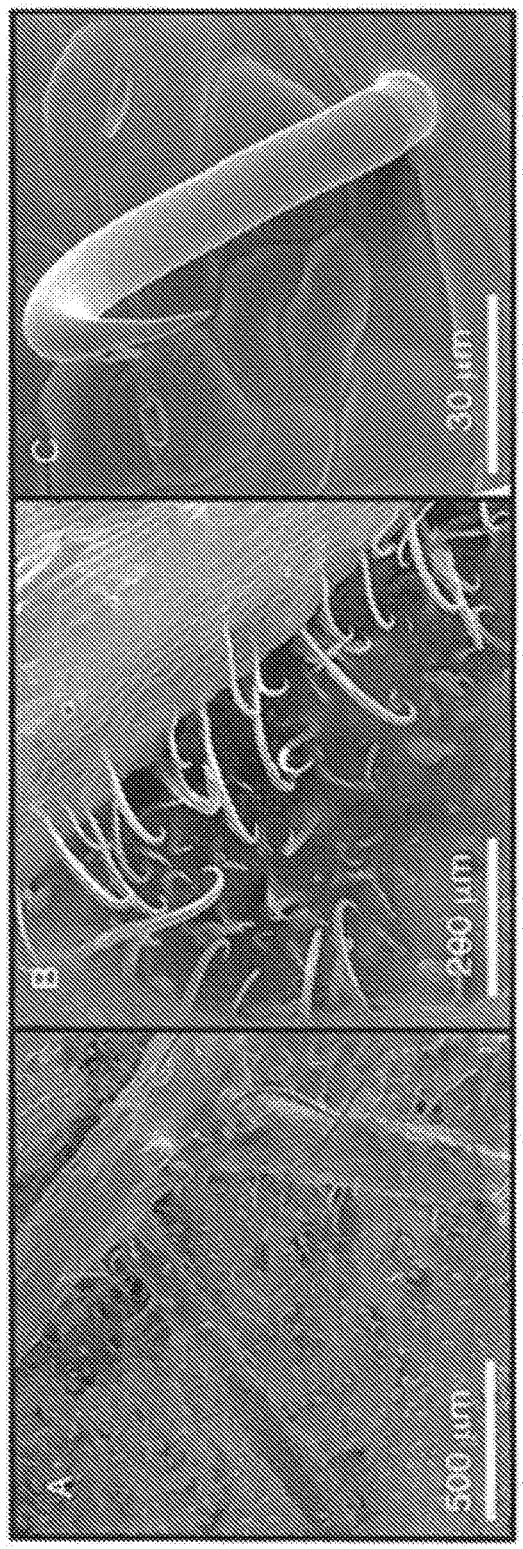
FIGS. 9A to 9C provide images of typical biomimetic hooks fabricated by dual molding method, wherein: (A) shows low magnification image showing epoxy recurved trichomes from a scarlet runner bean, (B) a vein on a biomimetic kidney bean leaf where the hooks are made from wood glue, and (C) a close view of the sharp, epoxy hooks replicated from a scarlet runner bean.

In order to further validate the fidelity of the proposed replication process, different bean leafs were reproduced and both the negative and the positive molds were examined using standard high vacuum scanning electron microscopy (SEM) techniques. The negative mold was freeze-fractured, mounted to view the cross section, and then sputter coated with gold. The resulting SEM is shown in FIGS. 8A to 8C, which clearly shows trichome microstructures whose geometry has remained intact. Likewise, FIGS. 9A to 9C shows representative images of the positive leaf replicas. A low magnification image of epoxy hooks replicating *Phaseolus coccineus* (Scarlet Runner bean) is shown in FIG. 9B. (In this image the larger veins are visible along with the trichomes on the surface.) FIG. 9C is a closer view of a biomimetic vein with sharp replicated hooks created from a *Phaseolus vulgaris* (kidney bean) leaf. The higher magnification image shows one of the epoxy sharp hooks replicating *Phaseolus coccineus* (Scarlet Runner bean). Various epoxies and glues with different hardening rates and resin:hardener ratios were tried. In this embodiment, the kidney bean leaf replica is made from TiteBond III, a type of wood glue. These images clearly demonstrate that the double molding process described in FIG. 3 can indeed generate biomimetic surfaces containing hooked trichomes with precision.

Conclusion

In this disclosure, the mechanism of bed bug capture by the microstructures of plant leaf surfaces, including three species of bean plants, were characterized and then employed in the design and fabrication of biomimetic insect capture surfaces for insect capture. Specifically, four different plant species have been examined, including: *Phaseolus vulgaris, Phaseolus coccineus, Phaseolus limensis*, and *Passiflora morifolia*. All four plant species have similar surface texture consisting of hooked trichomes, which can impale or hook bed bug tarsi. The interaction between the plant microstructure and bed bug tarsi has been documented by both videography and low vacuum scanning electron microscopy (LV-SEM). Furthermore, the location of trichome piercing on bed bug legs has been determined.

One way to duplicate the mechanical properties of the natural surface is to match both the geometry and the material properties of the synthetic surface to the natural leaf. Using leaf surfaces as models, biomimetic polymeric surfaces for the capture of insects, including bed bugs have been formed and tested. In addition, a process for constructing these insect capture surfaces. In some embodiments, the process is two-fold: 1) a negative mold of the leaf is made, and 2) a second material is then poured onto the negative mold, which generates a positive leaf replica. This method is further shown to faithfully reproduce the functional aspects of the plant trichomes. The molding process generated microfabricated trichomes that were indistinguishable from the natural trichomes, with the proper aspect ratio and sharpness of tips, arranged with the same density, orientation and height seen on the natural leaves.

Capturing bed bugs (or other insects) with microfabricated surfaces is a physical rather than a chemical approach, and therefore leaves no chemical residue, and does not expose people to pesticide treatments. This is a sustainable "green technology." By incorporating insect-trapping microfabrications into substrates (carpet, rugs, drapery, dust ruffles, suitcases, etc.) the invention also would enable monitoring and prevention of future infestations in homes, hotels, dormitories, schools, offices, and other dwellings. This device can then be used in bed bug abatement to capture bed bugs for detection or control. For detection, the insect-entrapping microfabrications could be incorporated into panels, strips, ropes, etc., and placed in strategic areas to alert building occupants, property managers, etc. of the presence of infestation. As a control device it could also be incorporated into the manufacture of carpet, rugs, drapes, dust ruffles, bedding, upholstery, and other furnishings for both prevention and remediation of infestations. No such device currently exists for bed bug abatement. A device that captures bed bugs by surface microfabrication has great potential in commercial applications as bed bugs are an escalating international problem in all manner of buildings, and therefore it is expected that this device will have widespread use.

Doctrine Of Equivalents

Those skilled in the art will appreciate that the foregoing examples and descriptions of various preferred embodiments of the present invention are merely illustrative of the invention as a whole, and that variations in the steps and various components of the present invention may be made within the spirit and scope of the invention. Accordingly, the present invention is not limited to the specific embodiments described herein but, rather, is defined by the scope of the appended claims.

What is claimed is:

1. A microfabricated insect capturing surface comprising: a substrate defining a plane; a plurality of insect capture surface microstructures each formed from a flexible elongated member, the plurality of surface microstructures being disposed on the substrate with a variable orientation to the plane of the substrate and at a density sufficient such that multiple insect capture surface microstructures are capable of simultaneously interacting with an insect disposed thereon; wherein at least some of the surface microstructures have a recurved body capable of entangling the insect, and wherein at least some of the surface microstructures include a piercing element being sufficiently rigid and sharp to pierce the insect body; and wherein the surface microstructures are formed from a material having a breaking stress sufficiently large to avoid breakage during interaction with the insect.

2. The microfabricated surface of claim 1, wherein each of the plurality of insect capture surface microstructures has a recurved body and wherein at least one piercing element is incorporated onto each of said insect capture surface microstructures.

3. The microfabricated surface of claim 2, wherein the piercing element is disposed at the terminating end of the elongated member.

4. The microfabricated surface of claim 2, wherein the surface microstructures include at least two piercing elements, and wherein the piercing elements are disposed along the body of elongated member.

5. The microfabricated surface of claim 1, wherein the recurved body is formed in a shape selected from the group consisting of a hook, curve, loop or hoop.

6. The microfabricated surface of claim 1, wherein the piercing element is selected from the group consisting of a sharp point, hook or barb.

7. The microfabricated surface of claim 1, wherein the plurality of surface microstructures are dimensioned such that engage the underside of the insect.

8. The microfabricated surface of claim 1, wherein the piercing element has a diameter of about 100 to 1000 nm.

9. The microfabricated surface of claim 1, wherein the elongated member has a Young's Modulus of from 1 to 23 GPa.

10. The microfabricated surface of claim 1, wherein the surface microstructures are modeled on a plant trichome.

11. The microfabricated surface of claim 10, wherein the plant trichome is modeled on one plant selected from the group *Phaseolus coccineus, Phaseolus vulgaris, Phaseolus limensis, Passiflora morifolia, Cynnoglossum officinale* and *Caiophora coronaria*.

12. The microfabricated surface of claim 1, wherein the surface microstructures are disposed on the substrate in a density of between 20 to 300 surface microstructures per square millimeter.

13. The microfabricated surface of claim 1, wherein the surface microstructures are formed from a material selected from the group consisting of polymeric materials, natural fibers, metals, oxides and nano- or micro-engineered structures.

14. The microfabricated surface of claim 1, wherein the elongated member is formed of a hollow body.

15. A method of manufacturing a microfabricated insect capturing surface comprising:
   providing a substrate defining a plane;
   disposing a plurality of insect capture surface microstructures thereon, each formed from a flexible elongated member, the plurality of surface microstructures being disposed on the substrate with a variable orientation to the plane of the substrate and at a density sufficient such that multiple insect capture surface microstructures are capable of simultaneously interacting with an insect disposed thereon;
   wherein at least some of the surface microstructures have a recurved body capable of entangling the insect, and wherein at least some of the surface microstructures include a piercing element being sufficiently rigid and sharp to pierce the insect body; and
   wherein the surface microstructures are formed from a material having a breaking stress sufficiently large to avoid breakage during interaction with the insect.

16. The method of claim 15, wherein each of the plurality of insect capture surface microstructures has a recurved body and wherein at least one piercing element is incorporated onto each of said insect capture surface microstructures.

17. The method of claim 16, wherein the piercing element is disposed at the terminating end of the elongated member.

18. The method of claim 16, wherein the surface microstructures include at least two piercing elements, and wherein the piercing elements are disposed along the body of elongated member.

19. The method of claim 15, wherein the recurved body is formed in a shape selected from the group consisting of a hook, curve, loop or hoop.

20. The method of claim 15, wherein the piercing element is selected from the group consisting of a sharp point, hook or barb.

* * * * *